United States Patent
Lorono et al.

(10) Patent No.: US 11,556,234 B2
(45) Date of Patent: Jan. 17, 2023

(54) WYSIWYG EDITOR FOR CREATING AND EDITING A FEATURE CONTROL FRAME FOR GEOMETRIC DIMENSIONING AND TOLERANCING IN COMPUTER-AIDED DESIGN SYSTEM

(71) Applicant: Dassault Systemes SolidWorks Corporation, Waltham, MA (US)

(72) Inventors: Matthew Lorono, Broomfield, CO (US); Abhijeet Kishor Narvenkar, Pune (IN)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 0 days.

(21) Appl. No.: 17/341,689

(22) Filed: Jun. 8, 2021

(65) Prior Publication Data
US 2021/0389870 A1   Dec. 16, 2021

(30) Foreign Application Priority Data
Jun. 12, 2020   (IN) .............................. 202011024848

(51) Int. Cl.
*G06F 3/048*   (2013.01)
*G06F 3/04847*   (2022.01)
(Continued)

(52) U.S. Cl.
CPC ........ *G06F 3/04847* (2013.01); *G06F 3/0482* (2013.01); *G06F 30/12* (2020.01); *G06F 2203/04803* (2013.01)

(58) Field of Classification Search
CPC .................................................. G06F 3/04847
See application file for complete search history.

(56) References Cited

U.S. PATENT DOCUMENTS

| | | | | |
|---|---|---|---|---|
| 6,146,027 A | * | 11/2000 | Orton ........................ | G06F 8/24 715/764 |
| 2006/0106476 A1 | * | 5/2006 | Tornquist ........... | G05B 19/4097 700/98 |

(Continued)

OTHER PUBLICATIONS

Extended European Search Report for EP application No. 21178383.2 dated Nov. 11, 2021.

(Continued)

*Primary Examiner* — Claudia Dragoescu
(74) *Attorney, Agent, or Firm* — Sheehan Phinney Bass & Green PA

(57) ABSTRACT

A computer-based method is disclosed for creating and/or editing a feature control frame (FCF) for geometric dimensioning & tolerancing (GD&T) of a model in a computer-aided design (CAD) program. The method includes displaying, in a graphics area of the CAD program, a cell of a FCF for a geometric feature of the model, displaying a context menu adjacent to the cell of the FCF, wherein the context menu comprises a first plurality of user-selectable input options associated with GD&T information for the geometric feature, receiving a user selection of one of the first plurality of user-selectable input options, and subsequently presenting a second plurality of user-selectable input options associated with GD&T information for the geometric feature. The options included in the second plurality of user-selectable input options depend, at least in part, on which of the first plurality of user-selectable input options the user selected.

24 Claims, 15 Drawing Sheets

(51) Int. Cl.
    *G06F 30/12*        (2020.01)
    *G06F 3/0482*     (2013.01)

(56) References Cited

U.S. PATENT DOCUMENTS

| | | | | |
|---|---|---|---|---|
| 2006/0242638 A1* | 10/2006 | Lew | ......................... | G06F 9/451 |
| | | | | 717/168 |
| 2007/0225846 A1* | 9/2007 | Bogan | ..................... | G06F 30/00 |
| | | | | 700/98 |
| 2016/0155249 A1* | 6/2016 | Moore | ..................... | G06F 8/34 |
| | | | | 715/227 |
| 2020/0004894 A1* | 1/2020 | Baran | ..................... | G06F 30/00 |

OTHER PUBLICATIONS

Dimensional Control Systems: "PTC CREO PMI Part 8—How to Use the CREO GD&T Advisor for PMI Creation", Oct. 31, 2018, retrieved from the Internet: URL: https//www.youtube.com/watch?v-rBNyWCgxvEO, retrieved Oct. 26, 2021.

Anonymous, "ISO 1101:2017(E) Geometrical product specifications(GPS)—Geometrical tolerancing—Tolerances of form, orientation, location and run-out", Jan. 1, 2017, pp. 1-154, retrieved from the Internet: URL:https://www.iso.org/standard/66777/html.

Cad/cae/cam tutorial: "NX CAD: How to Add Geometric Dimensioning & Tolerance (GD&T) and Datum", youtube, Dec. 10, 2019, pp. 1-5, retrieved from the Internet: URL:https://youtube.com/warch?v=j0I1-8UyOHc.

Sigmetrix: "GD&T Advisor Extension for PTC Creo 4.0", youtube, Sep. 5, 2017, pp. 1-6, retrieved from the internet: URL: https://www.youtube.com/watch?v=7r3NNEIsdUA.

* cited by examiner

WYSIWYG EDITOR FOR CREATING AND EDITING A FEATURE CONTROL FRAME FOR GEOMETRIC DIMENSIONING AND TOLERANCING IN COMPUTER-AIDED DESIGN SYSTEM

CROSS-REFERENCE TO RELATED APPLICATION(S)

This application claims the benefit of priority to Indian Patent Application No. 202011024848, entitled WYSIWYG EDITOR FOR CREATING AND EDITING A FEATURE CONTROL FRAME FOR GEOMETRIC DIMENSIONING AND TOLERANCING IN COMPUTER-AIDED DESIGN SYSTEM, which was filed on Jun. 12, 2020. The disclosure of the prior application is incorporated by reference herein in its entirety.

FIELD OF THE INVENTION

This application relates to an editor for creating and editing feature control frames in a computer-aided design program and, more particularly, relates to a what you see is what you get (WYSIWYG) style editor for that application.

BACKGROUND

Geometric dimensioning and tolerancing (GD&T) refers to a system for defining and communicating engineering tolerances. In general, the system uses a symbolic language on engineering drawings and computer-generated three-dimensional solid models that describe ideal geometries and allowable variations.

SUMMARY OF THE INVENTION

In one aspect, a system a computer-based method is disclosed for creating and/or editing a feature control frame (FCF) for geometric dimensioning & tolerancing (GD&T) of a model and/or a two-dimensional (2D) drawing (hereinafter, "model") in a computer-aided design (CAD) program. The method includes displaying, in a graphics area of the CAD program, a cell of a FCF for a geometric feature of the model, displaying a context menu adjacent to the cell of the FCF, wherein the context menu comprises a first plurality of user-selectable input options associated with GD&T information for the cell, receiving a user selection of one of the first plurality of user-selectable input options, and subsequently presenting a second plurality of user-selectable input options associated with GD&T information for the geometric feature. The options included in the second plurality of user-selectable input options depend, at least in part, on which of the first plurality of user-selectable input options the user selected.

In another aspect, a computer-based system includes a computer-based processor, and computer-readable memory storing computer-readable instructions for a computer-aided design (CAD) program that, when executed by the computer-based processor, causes the computer-system to run the CAD program and facilitate creating and/or editing a feature control frame (FCF) for geometric dimensioning & tolerancing (GD&T) of a model in the CAD program by: displaying, in a graphics area of the CAD program, a cell of a FCF for a geometric feature of the model, displaying a context menu adjacent to (e.g., below) the cell of the FCF, wherein the context menu comprises a first plurality of user-selectable input options associated with GD&T information for the geometric feature, receiving a user selection of one of the first plurality of user-selectable input options, and subsequently presenting a second plurality of user-selectable input options associated with GD&T information for the geometric feature. The options included in the second plurality of user-selectable input options depend, at least in part, on which of the first plurality of user-selectable input options the user selected.

In some implementations, one or more of the following advantages are present.

For example, in some implementations, the systems and techniques disclosed herein provide for an easy-to-use, intuitive interface for creating and/or editing a feature control frame in a CAD-based software environment. In a typical implementation, content entry and content presentation occur at the same location in the graphics area of the user interface for the CAD system. This helps users entering better understand and imagine the results of additions and changes they make as they make them. In a typical implementation, the systems and techniques disclosed herein help in error prevention and guiding new users to build a FCF systematically.

In a typical implementation, the systems and techniques disclosed herein help to ensure compliance with applicable industry standards for FCFs and GD&T. Moreover, in a typical implementation, the systems and techniques disclosed herein facilitate ensuring that users comply even if one or more of the applicable standards evolve.

Moreover, in a typical implementation, the user is guided along by the user interface as to what features might be worth including in the feature control frame and offers only those options to users that make sense within the context of a particular situation. In some instances, for example, the systems and techniques will present different options to a user depending on previous choices made by the user in creating or editing a FCF.

Other features and advantages will be apparent from the description and drawings, and from the claims.

BRIEF DESCRIPTION OF THE DRAWINGS

Like reference characters refer to like elements.

DETAILED DESCRIPTION

Figure 1:
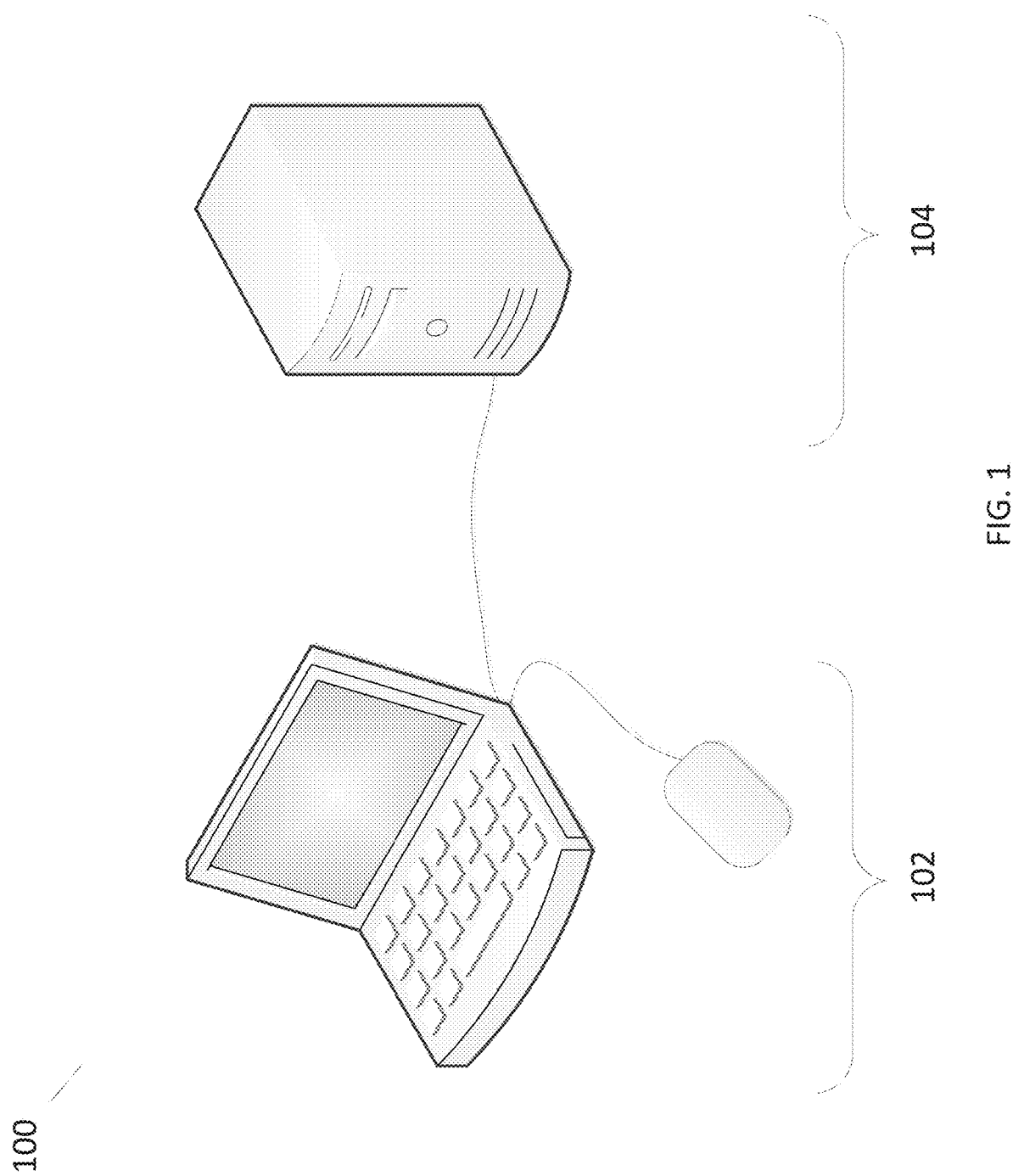
FIG. 1 is a schematic representation of an example of a computer system configured to facilitate the creating and editing FCFs in a CAD software environment.

A Feature Control Frame (FCF) is a graphical feature that may be produced on a computer-aided design (CAD) drawing, for example, that describes various geometric dimensioning and tolerancing (GD&T) information for a product (e.g., a mechanical part or assembly, etc.) that appears in the drawing.

In general terms, the GD&T information describes nominal (e.g., theoretically perfect), as-modeled, or as-intended geometry for the product and allowable variations thereof. This information informs manufacturing staff and machinery, for example, as to desired dimensions and the degree of accuracy and precision that is required on each controlled feature of a product being manufactured. Dimensioning specifications (e.g., basic dimensions) may be used to define, for example, the nominal, as-modeled or as-intended geometry. Tolerancing specifications may be used to define, for example, allowable variations on form and size of individual features on the product, as well as allowable variations in orientation and location of the individual features, etc. There are a variety of ways in which tolerances may be specified in GD&T. One such example involves specifying a tolerance with respect to a datum. A datum may be an object/product (e.g., a point, a line, a plane, a hole, a pair of surfaces, etc.) that serves as a reference in defining the geometry of the object and measuring aspects of the actual geometry to assess how closely they match, or should match, with a nominal value.

There are several standards available that describe symbols and rules that can be used for GD&T. Some such standards include the American Society of Mechanical Engineers (ASME) standard Y14.5 and International Standards Organization (ISO) standards ISO 1101, ISO 14405-1, and ISO 14405-2. Other applicable standards may include those promulgated by the British Standards Institution (BSI), Guobiao (GB), GOST, Japanese Industrial Standards (JIS), Deutsches Institut für Normung (DIN), and the American National Standards Institute (ANSI). The terminology, abbreviations, and symbols used herein are described in the applicable standards, especially the ASME and ISO standards mentioned above. All of the foregoing applicable standards, including the ASME and ISO standards are hereby incorporated by reference in their entireties and the terminology, abbreviations, and symbols used herein would be understood by a person of skill in the applicable field.

The standards can be complex and tend to change over time. The systems and techniques disclosed herein tend to simplify compliance with the applicable standards and any time an applicable standard evolves, the systems and techniques disclosed herein can be adapted accordingly, thus making it easy to remain compliant even as the standards may change over time. Moreover, in a typical implementation, the system disclosed herein aligns cells and data entries in a FCF according to content not order of creation, and also aligns the cell and data entries according to applicable (e.g., ASME, etc.) standards.

The systems and techniques disclosed herein facilitate the creating and editing FCFs to appear on a CAD drawing in association with a model in the CAD drawing. In a typical implementation, the systems and techniques disclosed herein provide a relatively simple, intuitive interface for creating and editing the FCFs. Moreover, in a typical implementation, the interface guides, prompts and enables the user to enter GD&T information in accordance with logic and following sequences that correspond to one or more (or all) of the applicable GD&T standards. The systems and techniques can evolve easily over time as the corresponding, applicable GD&T standards evolve. The prompt(s) and fields that the system presents to the user at particular points in time may depend, at least in part, on the user's response to earlier prompt(s) and earlier field entries by the user, so that the sequence of prompts and fields presented by the system may vary depending on how the user responds to prompts and the like along the way. The systems and techniques typically help the user better understand how to create a complete and helpful FCF for a particular feature of a model shown in the CAD drawing. In a typical implementation, the interface also enables the user to attach notes, textual descriptors, and the like to the FCF in an easy-to-use, intuitive manner.

In a typical implementation, the FCF appears on screen in the graphics area of the CAD program and adjacent to, and logically associated with (e.g., by being connected via a leader line to) one or more particular features of the CAD model. The interface that includes user prompts and fields for text entry typically appears adjacent to the FCF. When the user provides a piece of information into the interface to create the FCF, the FCF may be updated, substantially in real time, in accordance with the new piece of information provided. Thus, from the user perspective, the system provides a "What you see is what you get" (WYSIWYG) type of experience for GD&T. More specifically, the WYSIWYG aspect of the systems and techniques disclosed herein allows the FCF content to be created and edited in a form that makes it easy for the user to see/understand what the FCF's appearance will be when printed or displayed as a finished object.

FIG. 1 shows an example of a computer system 100 configured to facilitate the creating and editing FCFs in a CAD software environment.

The illustrated computer system 100 includes a user's computer 102 and an external server 104 (e.g., a server). The user's computer 102 has an internal computer-based processor, internal computer-based memory, an integrated keyboard input, an integrated computer monitor, and a mouse input device. The external server 104 also has an internal computer-based processor and computer-based memory. CAD software is stored in the system 100 (e.g., in the computer memory or server memory or distributed therebetween). The CAD software includes computer-readable instructions that, when executed by the computer-based processor in the computer 102 and/or server 104, causes the computer 102 and/or server 104 to perform functionalities associated with a traditional CAD program as well as additional functionalities disclosed herein within the CAD environment.

In this regard, the system 100 enables users to create and/or modify CAD models. The computer-based processor(s) uses the computer monitor to display the CAD models and to make visible at the computer monitor other aspects of the CAD program described herein. Using the keyboard and/or the mouse (and/or other input devices), the user can enter and/or modify data associated with the CAD model. This information can include, for example, GD&T information that may end up being represented on the computer monitor in connection with a feature control frame. The computer-based processor in the computer 102 accepts and processes input information from the keyboard and the mouse to make corresponding and appropriate changes to the display on the computer monitor.

Figure 2:
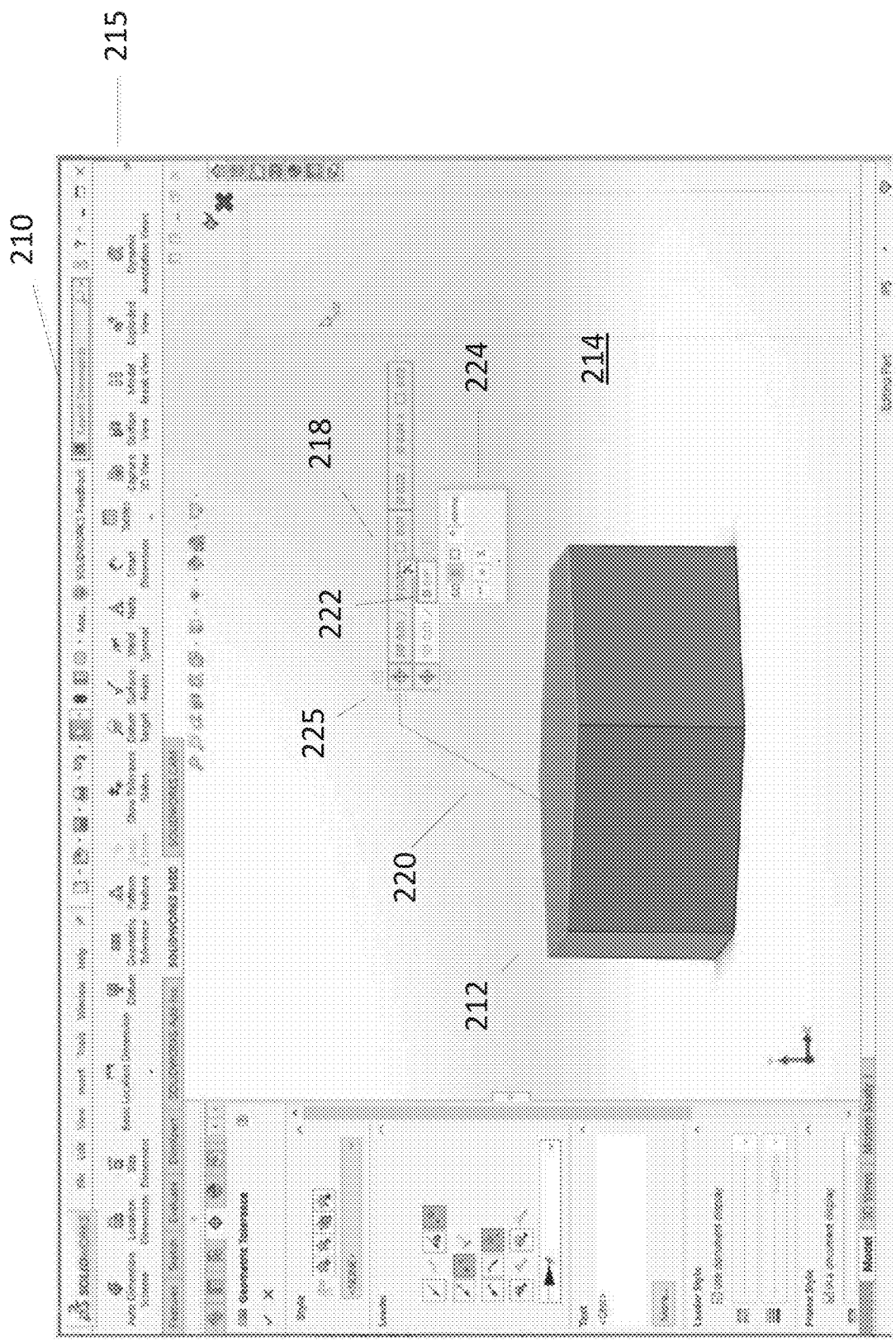
FIG. 2 is a example of a screenshot that might appear on the computer display in the system of FIG. 1.

FIG. 2 shows an example of a display generated on the computer monitor of computer 102 by the CAD software. The display includes a window 210 divided into: 1) a modeling (or graphics) portion 214, in which a three-dimensional (3D) model 212 is shown having been rendered, 2) a ribbon 215 at the top of the window 210 that provides access to many basic CAD commands, and 3) a geometric tolerances portion 216 at the left side of the window 210 that enables a user to specify a style, a leader, text, a leader style, a frame style, etc. associated with GD&T in the CAD program. An exemplary FCF 218 is shown being created (or edited) in the illustrated implementation. The illustrated FCF 218 is located graphics portion 214 of the window 210, adjacent to the rendering of the 3D model 212, and connected to an associated feature of the rendered 3D model 212 with a leader line 220.

The illustrated FCF has a plurality of cells (boxes) arranged in two rows, one atop the other. Each cell specifies one or more characteristics associated with GD&T of the rendered model. The rightmost cell on the bottom row in the illustrated implementation is an active cell 222. This means that a user has selected or activated the active cell 222 (e.g., by clicking on the cell using a mouse or keyboard entries) and that the active cell 222 is able to receive an input value that the user specifies. Typically, a user can activate only one cell at a time in a particular FCF 218.

A context menu 224 for the active cell 222 is shown adjacent to the activate cell 222. The context menu 224 has a plurality of user-selectable options for entries into the active cell 222. The context menu 224 enables a user to scroll across the options presented (e.g., by manipulating the mouse or by entering strokes on the keyboard) and to select a particular one of the options (e.g., by mouse click, or pressing an enter key or the like on the keyboard).

In a typical implementation, the particular collection of user-selectable options presented in a context menu 224 for a particular active cell 222 will depend at least in part on the standards-based logic that is stored in computer-based memory and implemented by the system 100. Moreover, in some instances, the particular collection of user-selectable options presented in a context menu 222 for a particular active cell will depend on prior inputs that a user has provided into the FCF 218 (e.g., by making a prior selection or by entering information earlier into the FCF 218).

Thus, in a typical implementation, the system 100 presents to the user options for a particular cell of a FCF that might be sensible/available based on the applicable industry standards and/or based on earlier selections or inputs provided by the user into the system 100. In this way, the system 100 makes it easy and intuitive for the user to provide information into the FCF in a manner that is sensible and efficient.

In a typical implementation, a user can construct and modify the 3D model 212, or features thereof, in a conventional manner. The user can then create one or more feature control frames associated with features in the model based on the techniques disclosed herein.

Referring again to FIG. 2, the illustrated FCF 218 has manipulators 225 just outside the outer edges of the FCF 218. The manipulators 225 appear as plus signs. One manipulator 225 is above the upper row of the FCF 218, one manipulator 225 is below the lower row of the FCF 218, one manipulator 225 is to the left of the upper row of the FCF 218, and a manipulator 225 is to the right of each of the upper and lower rows of the FCF 218. Although the illustrated manipulators 225 appear outside the FCF 218, a manipulator can appear outside an FCF (as shown in FIG. 2) or inside one or more cells of an FCF. In a typical implementation, the system 100 is configured such that a user selecting one of these manipulators 225 (e.g., through manipulation of the mouse or strokes on the keyboard) causes the system to provide access to other system functionalities associated with the FCF and/or specifying GD&T characteristics. v According to an exemplary implementation, if a particular manipulator 225 is outside and adjacent to a particular cell of an FCF, then that particular manipulator 225 may be accessible (e.g., selectable by a user), for example, at all times until the associated cell is active. In this regard, if such a manipulator 225 is selected then, based on its position relative to its associated cell, the system 100 will display a menu, with user-selectable options, data fields, etc., or will display a new cell for the FCF that can accommodate other information. If a particular manipulator 225 is inside a cell, then those manipulators may be accessible, for example, until the associated cell is active. Manipulators within a cell may be used to access certain system 100 functionalities including, for example, the random access menu discussed herein. In certain implementations, when the random access menu appears, any elements already added to the FCF will be shown (by visual distinction) to be disabled options. The random access menu is referred to as being random access because when it is on screen, the user can access any of the screens associated with an entry in the random access menu at any time and in any order.

In some implementations, the position of the selected manipulator relative to the cell it is adjacent to may determine where the menu, cell, or other item would appear. For example, if the manipulator 225 to the right of the FCF in FIG. 2 were selected, then the system 100 may produce a menu (with user-selectable options to specify datum or another tolerance, for example) at the right of the FCF in FIG. 2.

In various implementations, the FCF 218 may include more manipulators 224 than shown in FIG. 2 or fewer manipulators 224 than shown in FIG. 2. As an example, if a particular FCF has one row only, the system 100 may present one manipulator 224 to the right of the FCF, one manipulator to the left of the FCF, one manipulator above the FCF and one manipulator below the FCF. In some implementations, less than one manipulator per side of an FCF may be provided as well. In some implementations, a manipulator (and/or a delete symbol) may appear in between two rows of FCF cells.

There is also a user-selectable delete button outside the active lower, right cell of the FCF. More specifically, in the illustrated implementation, the user-selectable delete button is at a right side, above, the active cell. The delete button is in the form of an "x." In a typical implementation, the system 100 provides a delete button for every selected (or active) cell along with its associated context menu if there is one. Selecting the delete button typically deletes the associated (active) cell as well as all of its contents.

Figure 3:
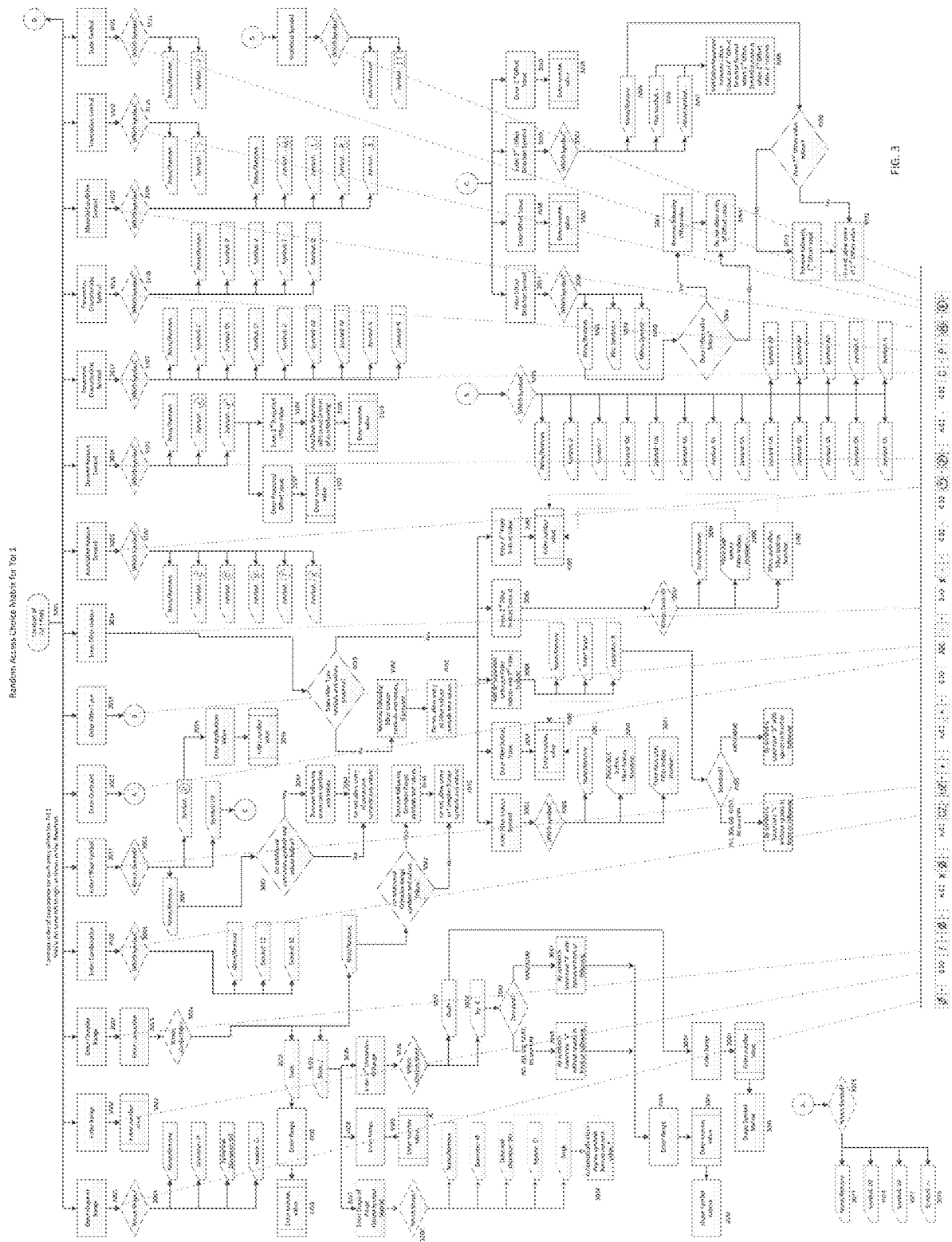
FIG. 3 is a flowchart that represents an implementation of logic that the system might apply in facilitating the creating and/or editing of an FCF in a CAD system.
Figure 4A:
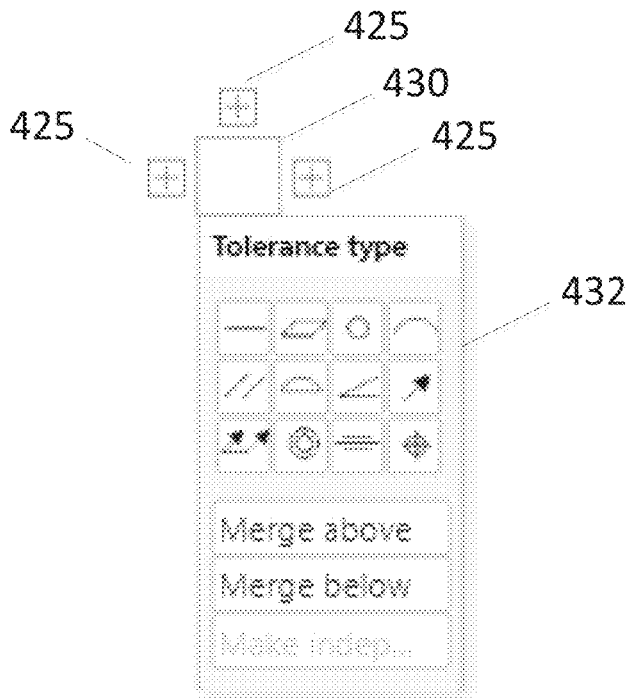
FIGS. 4A to 4P include a series of partial example screenshots that might appear on the computer display of FIG. 1 according to the implementation represented in FIG. 3.
Figure 4B:
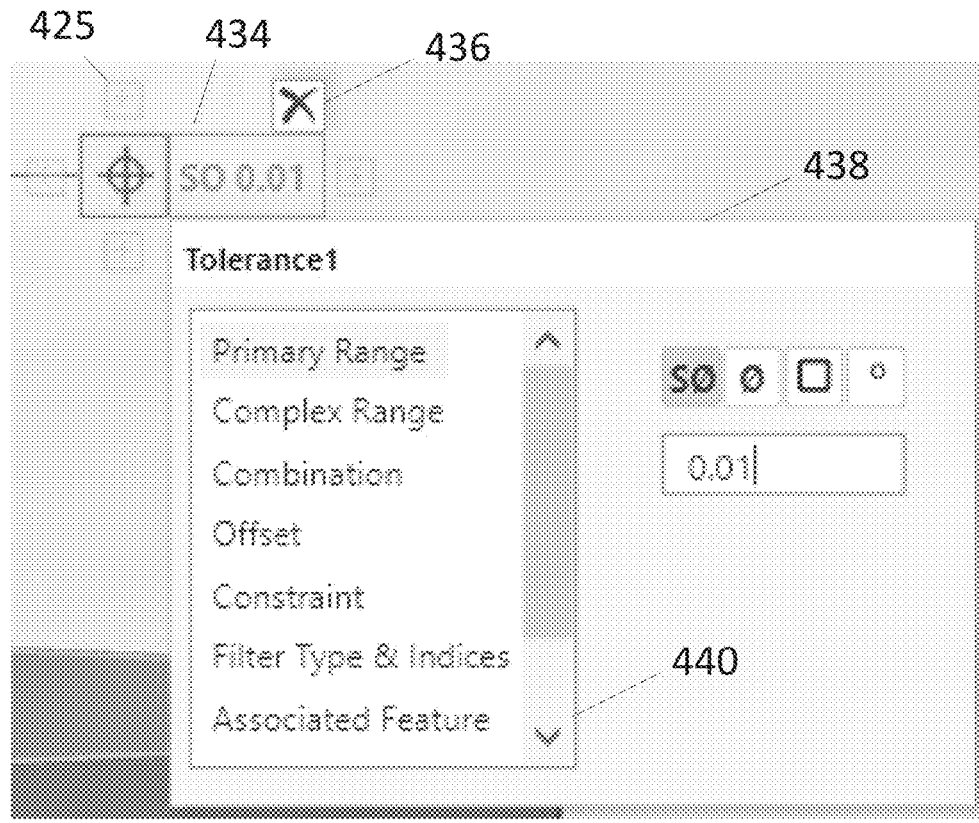
Figure 4C:
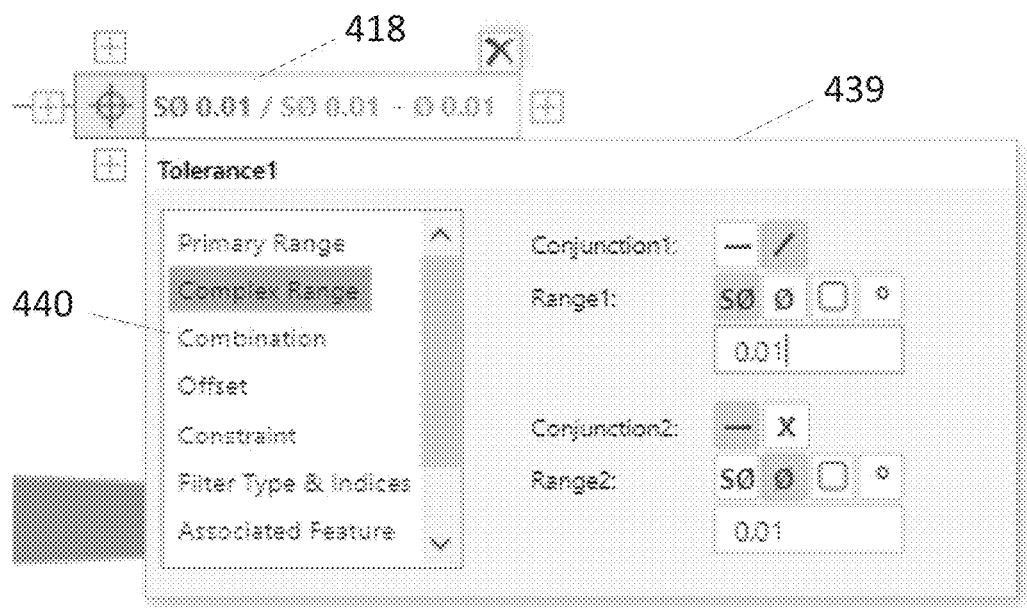
Figure 4D:
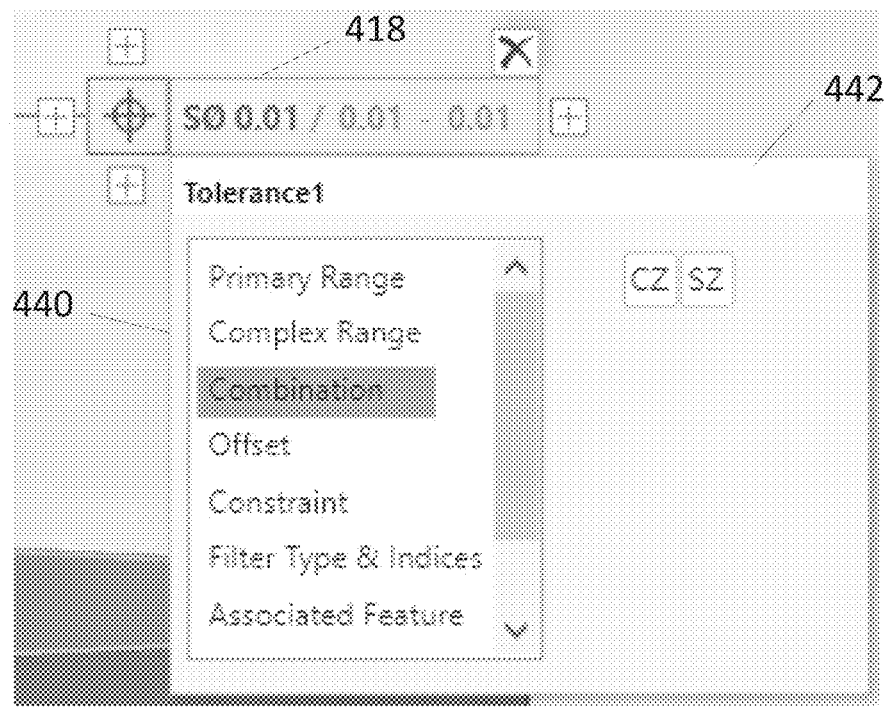
Figure 4E:
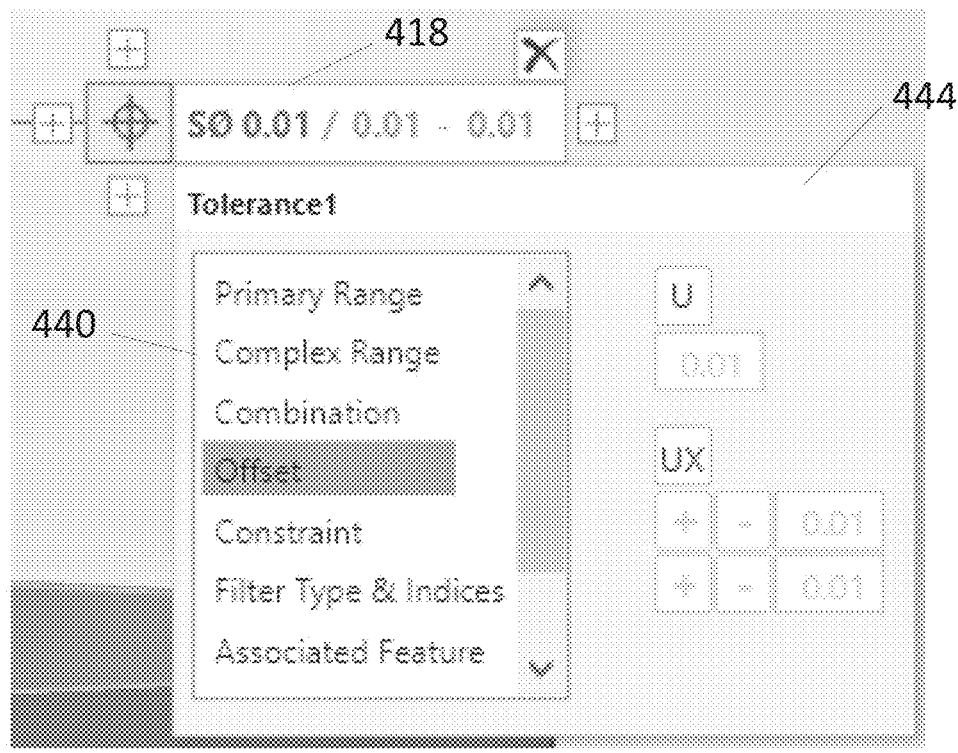
Figure 4F:
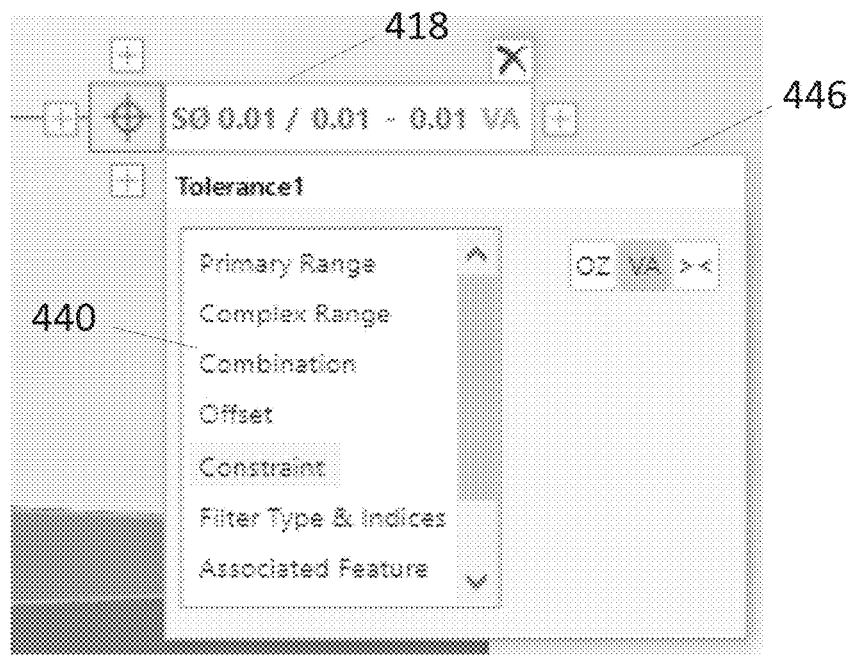
Figure 4G:
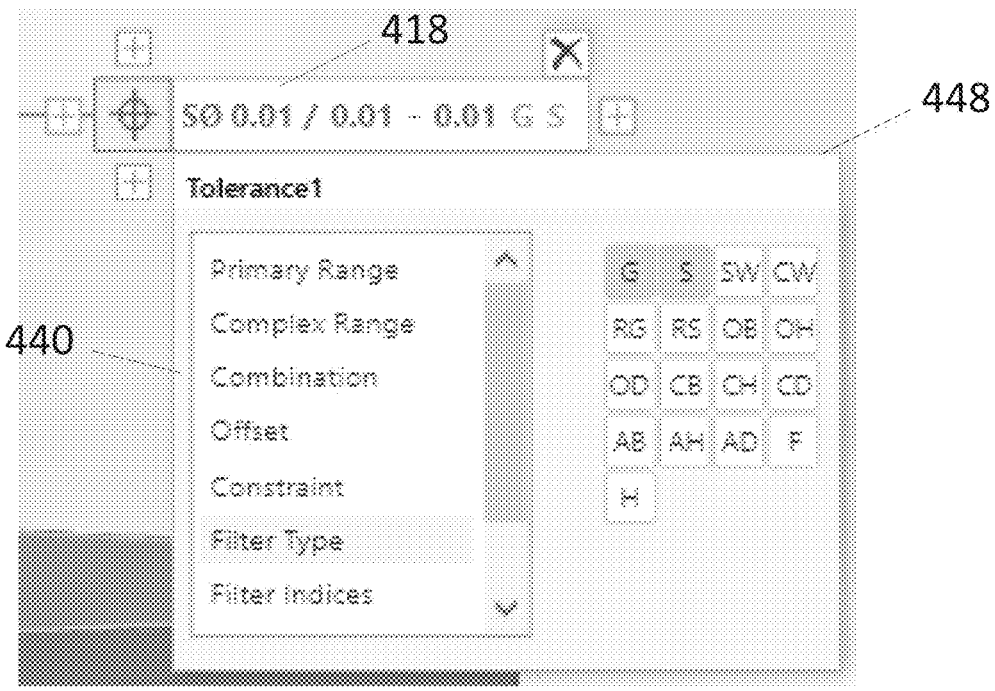
Figure 4H:
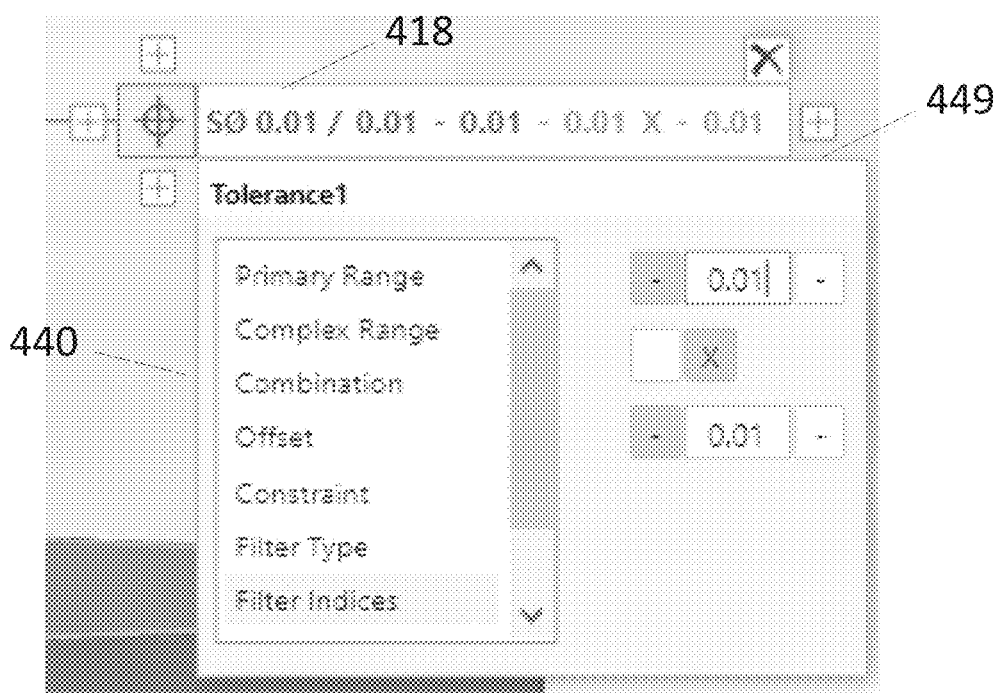
Figure 4I:
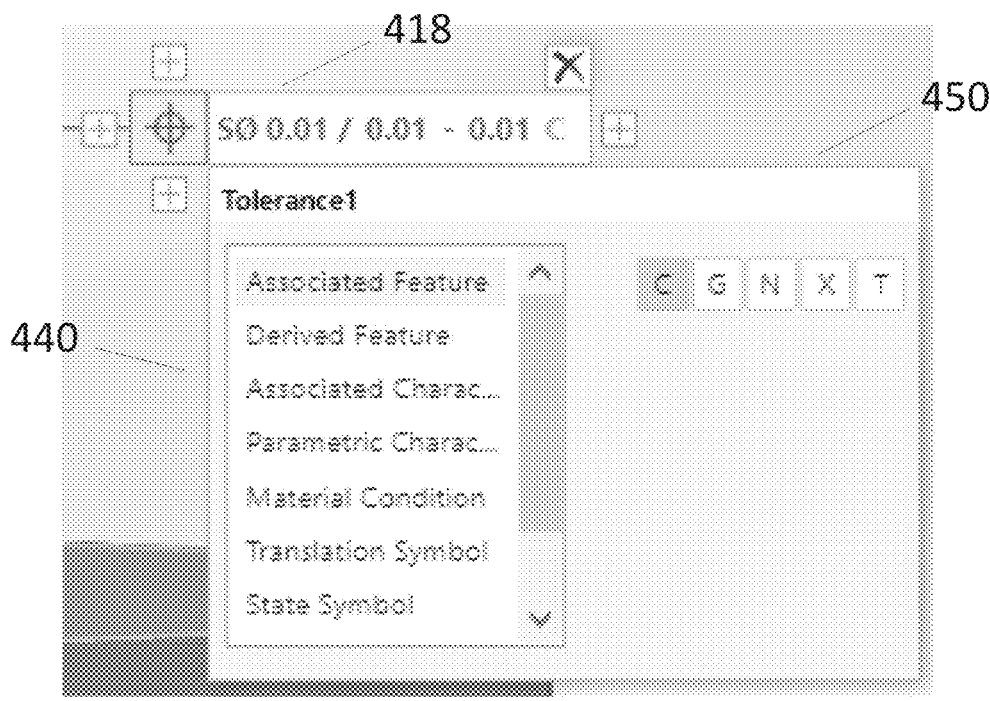
Figure 4J:
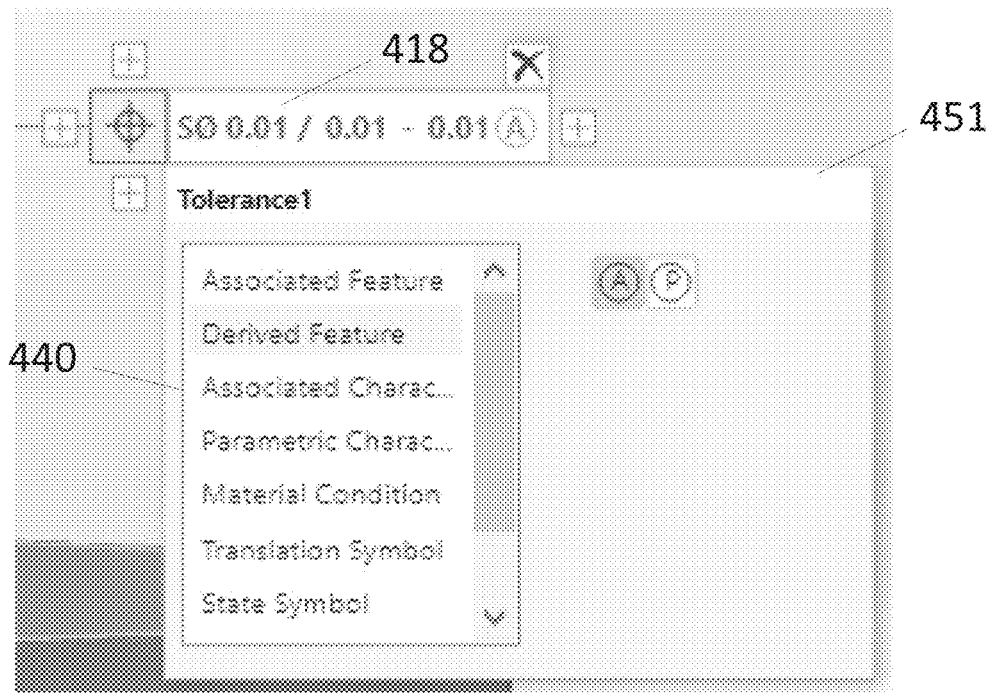
Figure 4K:
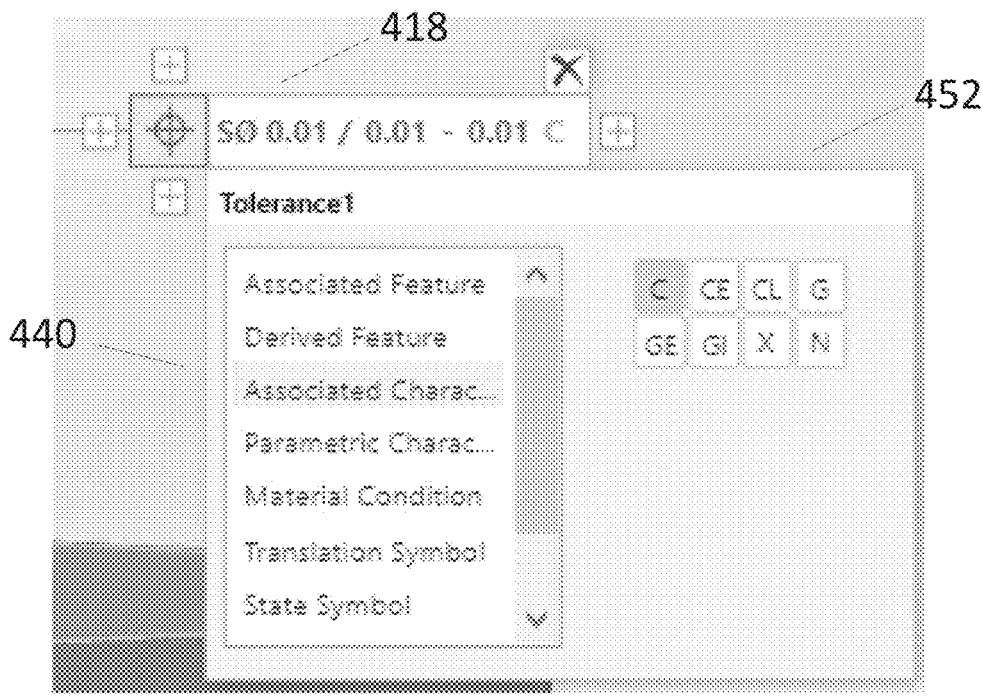
Figure 4L:
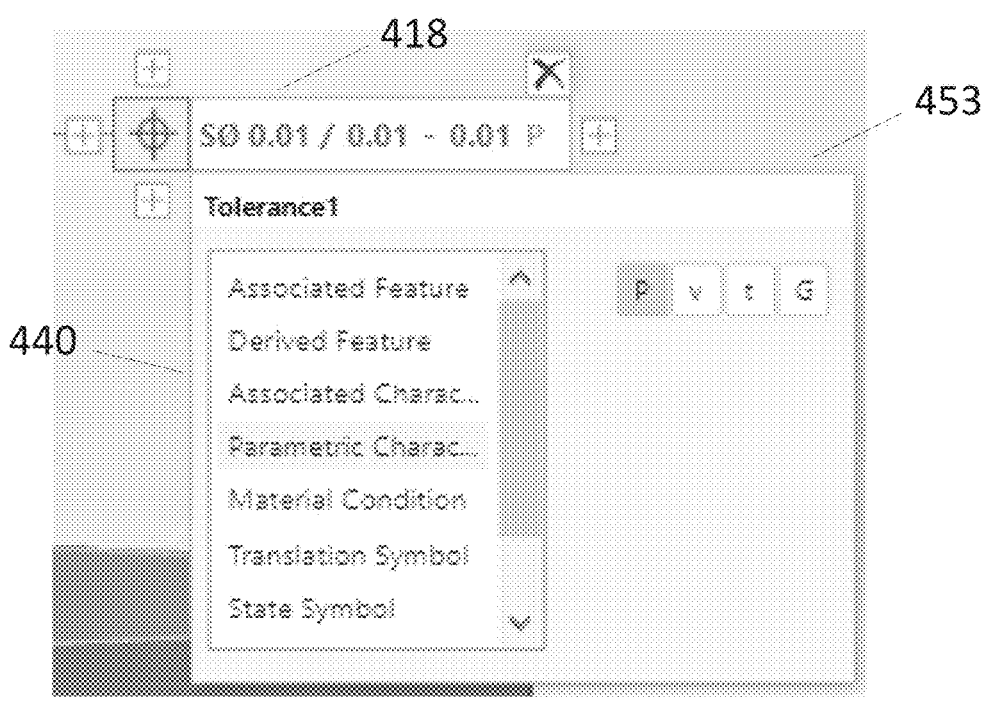
Figure 4M:
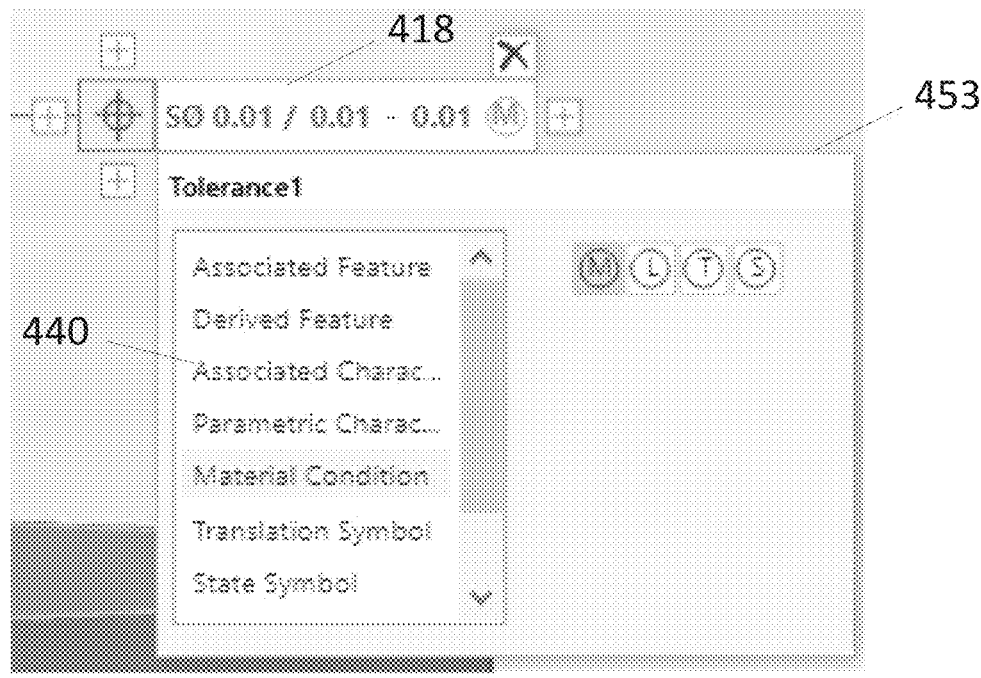
Figure 4N:
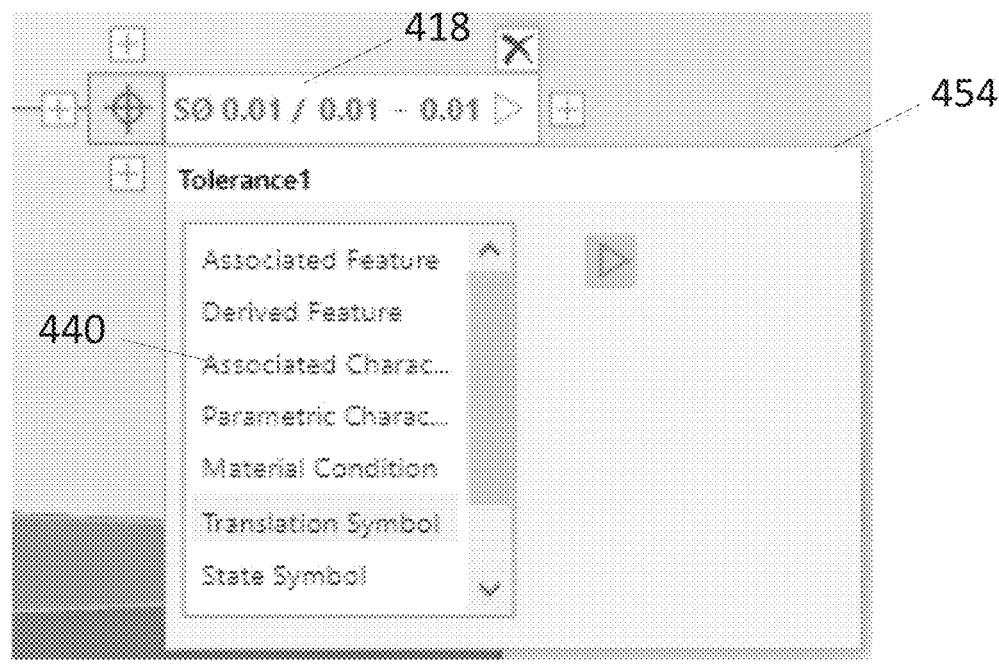
Figure 4O:
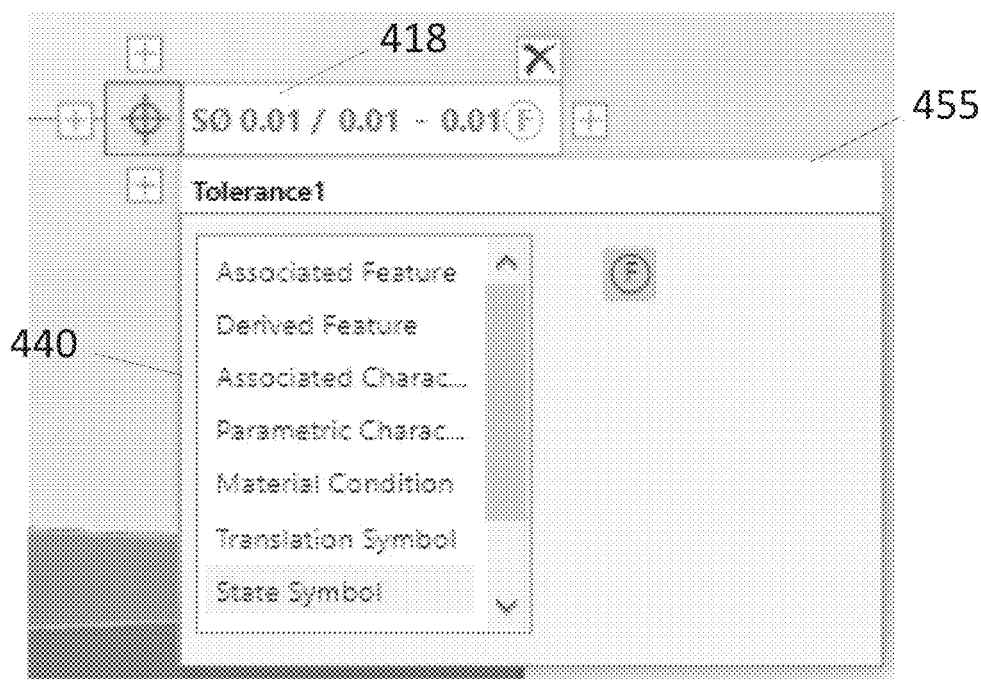
Figure 4P:
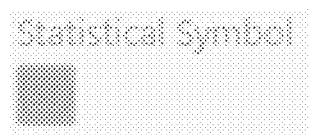

FIG. 3 is a flowchart that represents one particular implementation of logic that the system 100 might apply in facilitating the creating and editing of an FCF in a CAD system, and FIGS. 4A-4P show a series of partial screen-shots according to the particular implementation in FIG. 3. It should be appreciated that FIG. 3 and FIGS. 4A-4P represent only certain implementations of the system. Numerous variations are possible.

An FCF can be particularly configured to specify a wide variety of combinations of GD&T information about an associated feature. If a FCF is to be provided to specify a tolerance for a particular feature, for example, it will always specify at least the tolerance type, the shape of the tolerance range and the tolerance range itself. Therefore, in a typical implementation, the system 100 is configured to prompt the user to specify these characteristics at least. First, according to FIG. 3, the system 100 (at 3001) creates a tolerance FCF. This typically includes presenting, in association with a particular feature of a model in a CAD drawing, the beginnings (e.g., a first cell) of a FCF for that feature.

FIG. 4A is a partial screenshot that shows an exemplary first cell 430 of a FCF, three manipulators 425 adjacent to the first cell 430, and a context menu 432 for the first cell 430. The context menu 432 has a header ("Tolerance type") that identifies the type of information to be populated in the associated first cell 430, a plurality of user-selectable options for tolerance type, and user-selectable buttons labeled "Merge above," "Merge below," and "Make indep . . . " The tolerance types represented by the user-selectable options are based on applicable industry standards. In various implementations, the tolerance types made available to the user for selection in the context menu 432 for the first cell can relate to form (e.g., straightness, flatness, circularity, and cylindricity), profile (e.g., profile of a line, and profile of a surface), orientation (e.g., perpendicularity, angularity, and parallelism), location (e.g., symmetry, position, and concentricity), and/or run-out (e.g., circular run-out, total run-out).

If a user selects one of the displayed user-selectable options (e.g., position ⌖), then that symbol will populate the first cell 430 of the FCF.

Next (at 3002), the system 100 enables the user to enter a shape of the range. Essentially, the system 100 does this by prompting the user to select (at 3003) a shape for the range from a plurality of user-selectable options, which include square, spherical diameter, diameter, or none. Also (at 3008), the system 100 enables the user to enter a range. Essentially, the system 100 does this, in some implementations, by providing a field where the user can enter a value for the range (at 3022).

FIG. 4B is a partial screenshot that shows an exemplary second cell 434 of the FCF (next to the first cell), a delete symbol 436 adjacent the second cell 434, four manipulators 425 adjacent to the FCF, and a context menu 438 for the second cell 434.

The context menu 438 has a header ("Tolerance1") that identifies the type of information to be populated in the associated second cell 434, a plurality of user-selectable options to specify a tolerance zone shape (e.g., spherical, diametric, etc.), and a field for entering a numerical value associated with the tolerance zone, which may be based on a particular unit of measurement. The tolerance zone shapes represented by the user-selectable options are based on applicable industry standards. If a user (at 3002) selects one of the displayed user-selectable options (e.g., the spherical diameter symbol option), then that symbol will appear in the second cell 434 of the FCF. For example, in the illustrated implementation, the spherical symbol option has been selected (as evidenced by it appearing darker than the other options), and appears in the second cell 434 of the FCF. Likewise, if the user (at 3022) enters a numerical value in the field beneath the user-selectable symbols, that numerical value appears in the second cell 434 of the FCF immediately following the selected tolerance zone shape symbol. In the illustrated example, the user has entered 0.01 into the field beneath the user-selectable symbols, therefore, 0.01 appears in the second cell 434 of the FCF adjacent the selected tolerance zone shape symbol.

The illustrated context menu also includes a random access menu 440 that appears in the illustrated context menu and every other context menu shown in FIGS. 4C-4O. The random access menu 440 includes a plurality of user-selectable options for accessing functionalities associated with creating or editing various different individual elements within the FCF anytime the random access menu 440 is shown. In a typical implementation, the user-selectable options in the random access menu 440 include feature characteristics such as primary range, complex range, combination, offset, constraint, filter type & indices (together or separately), associated feature, derived feature, associated characteristic, parametric characteristic, material condition, translation symbol, and state symbol.

According to the illustrated implementation, the second cell of the FCF has been populated with the spherical diameter symbol (e.g., by a user having selected the user-selectable option (e.g., button) that has the spherical diameter symbol in it. According to the illustrated implementation, this option (spherical diameter) would no longer be available to add to the FCF (or the row of the FCF displayed). Therefore, the button that corresponds to this user-selectable option (the spherical diameter button) is no longer selectable and is shown as being visually distinct from the other buttons that are available for selection still. More specifically, in the illustrated implementation, the spherical diameter button is visually distinct by virtue of having been darkened.

Likewise, in other figures (e.g., FIGS. 4C, and 4F-4O) certain buttons are shown as being darkened (and, therefore, unavailable to be selected by a user). These buttons are unavailable to be selected by a user because the items that they relate to already have been added to the FCF or the row of the FCF displayed in the figure.

In the flowchart of FIG. 3, each item from the random access menu 440 is represented as a user-selectable option— enter range 3008, enter complex range 3009, enter combination 3010, enter offset symbol 3011, enter constraint 3012, enter filter type 3013, enter filter indices 3014, associated feature symbol 3015, derived feature symbol 3016, associated characteristic symbol 3017, parametric characteristic symbol 3018, material condition symbol 3019, translation symbol 3020, state symbol 3021, and statistical symbol 3112.

If a user (at 3009) selects the "complex range" option from the random access menu 440, the system 100 presents to the user a screenshot that includes what is shown in FIG. 4C. The illustrated screenshot includes a partial FCF, and a context menu 439 that includes the random access menu 440 (where the "complex range" option is shown as having been selected), and inputs for the user to provide for two conjunctions (conjunction1 and conjunction2) including, for each conjunction, a first pair of user-selectable conjunction options (dash or slash), a plurality of user-selectable range shapes, and a field for the user to enter a value for the associated range.

Referring again to the flowchart of FIG. 3, the user (at 3023) selects one of the conjunctions and depending on which conjunction (3024) is selected, the process proceeds in a particular manner. If, for example, the user selects a dash (3025), then the system 100 (at 3702) prompts the user to enter a range and the user does so (at 3703). If, on the other hand, the user selects a slash (3026), then the system 100 enables the user to either enter a shape of a range (3027), enter a range (3028), or enter a $2^{nd}$ dimension of range (3029). If the user enters a shape of a range (3200) the shape selection options can include none/remove, diameter, spherical diameter, square, or angle. If angle is selected, then the system 100 (at 3034) automatically applies a degrees symbol behind the value. If the user opts (at 3028) to enter the range, the user does so (at 3035). If the user opts to enter a $2^{nd}$ dimension of range (at 3029), depending (3036) on which conjunction (e.g., dash 3037 or x 3038) is selected, the system 100 (if dash), enables the user to enter a range (at 3039), the user enters a number value (at 3040) and can then access a shape symbol matrix (3041).

In a typical implementation, the system 100 is configured such that the user is only permitted to (or able to) enter the additional information downstream of the dash or x selection (at 3037 or 3038) after the user makes the selection. Otherwise, the system 100 does not enable the user to enter the information.

The system 100 is generally configured such that the system 100 adjusts the options available to the user as the user makes certain selections. This helps minimize the universe of choices that the user has to consider at various points in time while creating the FCF, which makes it easier for the user to navigate through the process and gives the user less to focus on. In a typical implementation, any options that are made unavailable to the user are made unavailable because the user's prior selections made those unavailable options moot. In a typical implementation, the user can still see any options that have been made unavailable. However, any options that have been made unavailable are typically displayed in a visually distinct manner (e.g., by shading them) to indicate the fact that they are not available for user selection.

As an example, in a typical implementation, the system 100 is configured such that the user is only permitted to enter a range (at 3702, 3703) if the user makes the indicated selection—the dash (at 3025). Otherwise, the associated range field may be unavailable. In that case, the user may not even be able to click into the field for data entry unless and until the selection has been made. Other examples of this sort of functionality appear throughout the application.

As another example, the system 100 is configured such that the user is only permitted to enter a shape of range, a range, and a $2^{nd}$ dimension of range (at 3027, 3029, 3029) if the user has made the indicated selection—the slash (at 3026). Otherwise, those options may be unavailable to the user.

If the "by x" branch is followed, depending on which standard is applicable (3042), the system 100 will follow one of two alternative paths. First, if the standard is an ISO, BSI, GB, GOST, JIS, or DIN standard, then (at 3043) the "by" symbol is lowercase "x" without spaces in front or following. If the standard is ANSI/ASME, then (at 3047), the "by" symbol is uppercase "X" with spaces in front or following. The system 100 then enables the user (at 3044) to enter a range, the user (at 3045) enters a number value and can then access a shape symbol matrix (3046).

If (at 3024) there is no conjunction (3042), for example, the system 100 (at 3043) considers whether additional complex ranges symbols and values follow. If so, the system 100 (at 3044) removes following complex range symbols and values and (at 3045) does not allow entry of complex range symbols and values. Otherwise, if (at 3043) additional complex ranges symbols and values do not follow, then the system 100 (at 3045) does not allow entry of complex range symbols and values. Thus, in the illustrated implementation, if neither a dash nor a slash is entered (at 3025, 3026), then the system 100 does not allow any complex range of symbol to exist.

If the user selects the "combination" option from the random access menu 440, the system 100 may present a screenshot that includes what is shown in FIG. 4D, which includes a partial FCF 418 and a context menu 442 that includes the random access menu 440, and two user-selectable options (CZ and SZ).

In some implementations, if the user selects the "combination" option from the random access menu 440, then the system 100 follows logic consistent with that represented in the branch that extends from the "enter combination" cell (3010) in FIG. 3. This includes enabling the user to specify a symbol, which may be either CZ, a common zone modifier, or SZ, a separate zone modifier, or to provide no such modified or remove such a modifier.

If the user selects the "offset" option from the random access menu 440, the system 100 may present a screenshot that includes what is shown in FIG. 4E, which includes a partial FCF 418 and a context menu 444 that includes the random access menu 440, and user-selectable options (U and UX), along with other graphical elements and text fields for value entry.

In some implementations, if the user selects the "offset" option from the random access menu 440, then the system 100 follows logic consistent with that represented in the branch that extends from the "enter offset symbol" cell (3011) in FIG. 3. This includes enabling the user to specify a symbol (at 3052), which may be either U or UX. If the symbol is U, then the system 100 enables the user to enter an application value (at 3055) and the user does so (at 3056). If the symbol is UX, then the system 100 enables the user to enter an offset direction symbol (at 3057), enter an offset value (at 3058), enter a $2^{nd}$ offset direction symbol (at 3059), and/or enter a $2^{nd}$ offset value (at 3060). However, in a typical implementation, if UX does not exist (e.g., a user hasn't selected UX, then none of the foregoing options exist and the system 100 would not make them available for selection to the user.

The user can remove an offset direction symbol (at 3061). If the user removes an offset direction symbol (at 3061) and the system 100 determines (at 3062) that additional constraint symbols and values follow, the system 100 removes the following constraint symbols and values (at 3063), and does not allow entry of constraint symbols and values (at 3064). If the user removes an offset direction symbol (at 3061) and the system 100 determines (at 3062) that no offset value follows, the system 100 simply does not allow entry of an offset value (at 3064).

The system 100 is generally configured such that the system 100 adjusts the options available to the user as the user makes certain selections. This helps minimize the universe of choices that the user has to consider at various points in time while creating the FCF, which makes it easier for the user to navigate through the process and gives the user less to focus on. In a typical implementation, any options that are made unavailable to the user are made unavailable because the user's prior selections made those unavailable options moot. In a typical implementation, the user can still see any options that have been made unavailable. However, any options that have been made unavailable are typically displayed in a visually distinct manner (e.g., by shading them) to indicate the fact that they are not available for user selection.

Thus, in the illustrated implementation, the system 100 is configured such that if neither U nor UX is entered (selected), then no constraint values or symbols can exist.

If the user (at 3059) enters a $2^{nd}$ offset direction symbol, then the symbol (3501) can be a plus symbol (3066) or a minus symbol (3067). In either case, the system 100 (at 3068) will add a colon separator between the offset value and the $2^{nd}$ offset direction symbol when the $2^{nd}$ offset value is chosen or when the $2^{nd}$ offset value is entered. The user can remove a $2^{nd}$ offset direction symbol (at 3069). If the user removes a 2nd offset direction symbol (at 3069) and the system 100 determines (at 3070) that a 2nd offset value follows, the system 100 removes the following $2^{nd}$ offset value (at 3071), and does not allow entry of an offset value (at 3072). If the user removes an offset direction symbol (at 3069) and the system 100 determines (at 3070) that no offset value follows, the system 100 simply does not allow entry of an offset value (at 3072). If the user (at 3060) opts to enter of a 2nd offset value, the user enters the $2^{nd}$ offset value (at 3073). In a typical implementation, if "+" or "−" does not exist (e.g., has not been selected by a user), then $1^{st}$ or $2^{nd}$ offset values will not exist and the system 100 will not present these options to the user.

If the user selects the "constraint" option from the random access menu 440, the system 100 may present a screenshot that includes what is shown in FIG. 4F, which includes a partial FCF 418, and a context menu 446 that includes the random access menu 440, and user-selectable options (OZ, VA and "><").

In some implementations, if the user selects the "constraint" option from the random access menu 440, then the system 100 follows logic consistent with that represented in the branch that extends from the "enter constraint" cell (3012) in FIG. 3, in which the user can select a symbol (3073) from among the user-selectable options presented OZ (3074), VA (3075) and "><" (3076). Alternatively, the user can opt to select none of those options or deselect a previously-selected option (at 3077).

If the user selects a "filter type" option from the random access menu 440, the system 100 may present a screenshot that includes what is shown in FIG. 4G, which includes a partial FCF 418, and a context menu 448 that includes the random access menu 440, and user-selectable options (G, S, SW, CW, RG, RS, OB, OH, OD, CB, CH, CD, AB, AH, AD, F and H).

In some implementations, if the user selects the "filter type" option from the random access menu 440, then the system 100 follows logic consistent with that represented in the branch that extends from the "enter filter type" cell (3013) in FIG. 3, in which the user can select a symbol (3078) from among the available symbols: G, S, SW, CW, RG, RS, OB, OH, OD, CB, CH, CD, AB, AH, AD, F and H.

If the user selects a "filter indices" option from the random access menu 440, the system 100 may present a screenshot that includes what is shown in FIG. 4H, which includes a partial FCF 418, and a context menu 449 that includes the random access menu 440, and the graphical elements shown in the figure for specifying filter index information.

In some implementations, if the user selects the "filter indices" option from the random access menu 440, then the system 100 follows logic consistent with that represented in the branch that extends from the "enter filter indices" cell (3014) in FIG. 3. If the system 100 determines (at 3079) that filter type symbols and values do not precede, the system 100 (at 3080) removes following filter indices, symbols and values, if present, and (at 3081) does not allow entry of filter indices symbols and values. Thus, in the illustrated implementation, if filter type does not exist (e.g., has not been entered), then filter value does not exist and the system 100 will not make options for filter value available to the user. If the system 100 determines (at 3079) that filter type symbols and vales do precede, then the system 100 enables the user to enter a filter indices symbol (at 3082), enter a filter indices value (at 3083), add a "By" separator between filter indices and $2^{nd}$ filter indices (at 3084), enter a $2^{nd}$ filter index symbol (at 3085), and/or enter a $2^{nd}$ filter index value (at 3086).

If the user opts to enter a filter index symbol (3082), the user can select the symbol (at 3088), which might be a dash before a filter index number (3090) or a dash after the filter index value (3091). Alternatively, the system 100 enables the user to deselect or remove such a symbol (3092), e.g., by pressing a previously-selected button. If the user opts to enter a filter index value, the user does so at 3089. In a typical implementation, if a filter indices symbol does not exist (e.g., it has been specified by a user), then the filter indices values will not exist and the system 100 will not make available to the user options for entering such values.

If the user opts to add a "By" separator (at 3084), the system 100 enables the user to insert a space, or a separator (e.g., by selecting user-selectable options), which depending on the applicable standard (3095), as determined by the system 100, will be a lowercase "x" without spaces in front or following (for ISO, BSI, GB, GOST, JIS and DIN), or an uppercase "X" with spaces in front or following (for ANSI/ASME). Alternatively, the system 100 enables the user to deselect or remove such a separator, e.g., by pressing a previously-selected button.

If the user opts to enter a $2^{nd}$ filter index symbol (3085), the user can select the symbol (at 3095), which might be a dash before a filter index number (3096) or a dash after the filter index value (3097). Alternatively, the system 100 enables the user to deselect or remove such a symbol (3098), e.g., by pressing a previously-selected button. If the user opts to enter a $2^{nd}$ filter index value, the user does so at 3099.

If the user selects the "associated feature" option from the random access menu 440, the system 100 may present a screenshot that includes what is shown in FIG. 4I, which includes a partial FCF 418, and a context menu 450 that includes the random access menu 440, and user-selectable options that include C, G, N, X, and T.

In some implementations, if the user selects the "associated feature" option from the random access menu 440, then the system 100 follows logic consistent with that represented in the branch that extends from the "associated feature symbol" cell (3015) in FIG. 3. In that case, the user is able to select a symbol (at 3100) from among the system-provided symbols: C, G, N, X, and T. The system 100 also enables the user to remove (or not specify) such a symbol. Removal typically would involve deselecting one of the previously-selected symbols.

If the user selects the "derived feature" option from the random access menu 440, the system 100 may present a screenshot that includes what is shown in FIG. 4J, which includes a partial FCF 418, and a context menu 451 that includes the random access menu 440, and user-selectable options that include A and P.

In some implementations, if the user selects the "derived feature" option from the random access menu 440, then the system 100 follows logic consistent with that represented in the branch that extends from the "derived feature symbol" cell (3016) in FIG. 3, in which the user is given the option of selecting a symbol (at 3101) from among A and P. If the P option is selected, then the user can opt to enter a projected offset value (at 3102) and enter a number value accordingly (at 3103), or enter a 2$^{nd}$ projected offset value (at 3104), add a dash separator with space in front of and following (at 3105) and enter a number value accordingly (at 3106).

If the user selects the "associated characteristic" option from the random access menu 440, the system 100 may present a screenshot that includes what is shown in FIG. 4K, which includes a partial FCF 418, and a context menu 452 that includes the random access menu 440, and user-selectable options that include C, CE, CL, G, GE, GI, X, and N.

In some implementations, if the user selects the "associated characteristic" option from the random access menu 440, then the system 100 follows logic consistent with that represented in the branch that extends from the "associated characteristic symbol" cell (3017) in FIG. 3, in which the user can select (at 3107) from among a plurality of user-selectable options: that include C, CE, CL, G, GE, GI, X, and N. Alternatively, the user can opt to remove (e.g., deselect) a particular one of the user-selectable options (if previously selected), and/or select none of the user-selectable options.

If the user selects the "parametric characteristic" option from the random access menu 440, the system 100 may present a screenshot that includes what is shown in FIG. 4L, which includes a partial FCF 418, and a context menu 453 that includes the random access menu 440, and user-selectable options that include P, v, t, and G.

In some implementations, if the user selects the "parametric characteristic" option from the random access menu 440, then the system 100 follows logic consistent with that represented in the branch that extends from the "parametric characteristic symbol" cell (3018) in FIG. 3, in which the user can select (at 3108) from among a plurality of user-selectable options: that include P, v, t, and G. Alternatively, the user can opt to remove (e.g., deselect) a particular one of the user-selectable options (if previously selected), and/or select none of the user-selectable options.

If the user selects the "material condition" option from the random access menu 440, the system 100 may present a screenshot that includes what is shown in FIG. 4M, which includes a partial FCF 418, and a context menu 453 that includes the random access menu 440, and user-selectable options that include M, L, T, and S, each of which appearing in a circle.

In some implementations, if the user selects the "material condition" option from the random access menu 440, then the system 100 follows logic consistent with that represented in the branch that extends from the "material condition symbol" cell (3019) in FIG. 3, in which the user can select (at 3109) from among a plurality of user-selectable options: that include M, L, T, and S, each of which is surrounded by a circle. Alternatively, the user can opt to remove (e.g., deselect) a particular one of the user-selectable options (if previously selected), and/or select none of the user-selectable options.

If the user selects the "translation symbol" option from the random access menu 440, the system 100 may present a screenshot that includes what is shown in FIG. 4N, which includes a partial FCF 418, and a context menu 454 that includes the random access menu 440, and a user-selectable arrow symbol.

In some implementations, if the user selects the "translation symbol" option from the random access menu 440, then the system 100 follows logic consistent with that represented in the branch that extends from the "translation symbol" cell (3020) in FIG. 3, in which the user can select (at 3110) the arrow symbol. Alternatively, the user can opt to remove (e.g., deselect) the arrow symbol (if previously selected), and/or opt to not select the arrow symbol.

If the user selects the "state symbol" option from the random access menu 440, the system 100 may present a screenshot that includes what is shown in FIG. 4O, which includes a partial FCF 418, and a context menu 455 that includes the random access menu 440, and a user-selectable F in a circle.

In some implementations, if the user selects the "state symbol" option from the random access menu 440, then the system 100 follows logic consistent with that represented in the branch that extends from the "state symbol" cell (3021) in FIG. 3, in which the user can select (at 3111) the F in a circle symbol. Alternatively, the user can opt to remove (e.g., deselect) the F in a circle symbol (if previously selected), and/or opt to not select the F in the circle symbol.

Finally, if the user selects a "statistical symbol" option (e.g., from the random access menu 440), the system 100 may present a screenshot that includes what is shown in FIG. 4O, which is a labeled, user-selectable statistical symbol ST in the indicated shape.

In some implementations, if the user selects the "statistical symbol" option, then the system 100 follows logic consistent with that represented in the branch that extends from the "statistical symbol" cell (3112) in FIG. 3, in which the user can select (at 3113) the ST in a shape symbol. Alternatively, the user can opt to remove (e.g., deselect) the ST in a shape symbol (if previously selected), and/or opt to not select the ST in a shape symbol.

As the user navigates through the screenshots of FIGS. 4A-4O and the logic represented in the flowchart of FIG. 3, the system creates (and/or edits) an FCF, an example of which is shown at the bottom of FIG. 3. Dashed lines extend in FIG. 3 from various points in the flowchart to the exemplary FCF to identify those portions of the flowchart that relate to creating or editing the various portions of the exemplary FCF.

Figure 5:
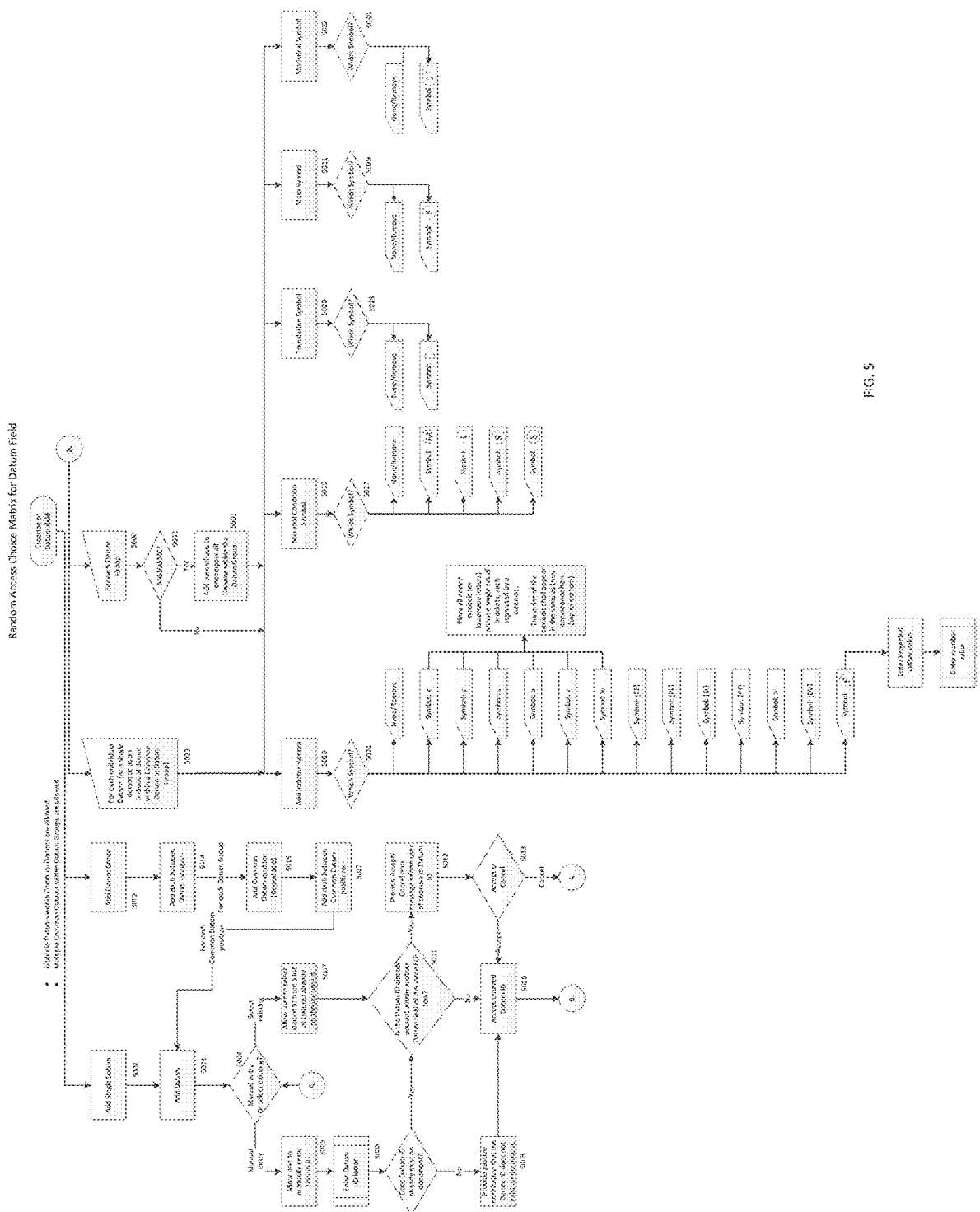
FIG. 5 is a flowchart that represents an implementation of logic that the system might apply in facilitating the creating and/or editing of a datum field for a FCF in a CAD system.
Figure 6:
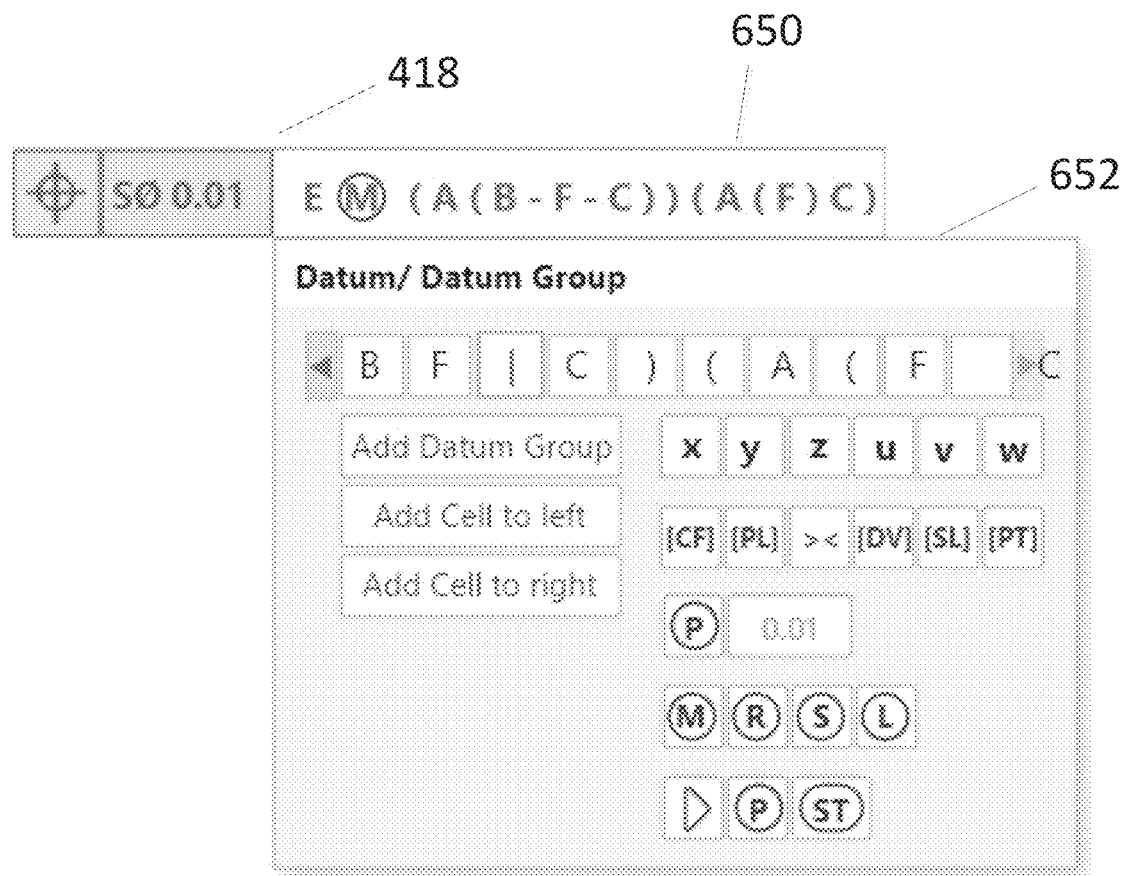
FIG. 6 is a partial example screenshot that might appear on the computer display of FIG. 1 according to the implementation represented in FIG. 5.

FIG. 5 is a flowchart that represents one particular implementation of logic that the system 100 might apply in facilitating the creating and/or editing of a datum field for a FCF in a CAD system, and FIG. 6 is a partial screenshot according to the particular implementation in FIG. 5. In general, a datum may be an object (e.g., a point, a line, a plane, a hole, a pair of surfaces, etc.) that serves as a reference in defining the geometry of the object and measuring aspects of the actual geometry to assess how closely they match, or should match, with a nominal value.

If the user opts to add a datum or datum group (e.g., by selecting an onscreen manipulator), then the system may respond by displaying a screenshot that includes what is shown in FIG. 6. The illustrated screenshot includes a partial FCF 418 with a datum/datum group cell 650 for the FCF, and a context menu 652 for the datum/datum group information. The context menu 652 includes a plurality of user-selectable options, with symbols and associated functionalities, and a data entry field.

In some implementations, if the user opts to add a datum or datum field, the system 100 follows logic consistent with that represented in the flowchart of FIG. 5.

In the flowchart of FIG. 5, the system 100 gives the user the option to add a single datum (5001) or to add a datum group (5002). If the user opts to add a single datum, the user may add the datum (5003) by manual entry or by selecting an existing datum (e.g., from the graphics area or feature manager design tree (FMDT)). If the user opts (at 5004) for manual entry, the system 100 allows the user to manually enter a datum ID (at 5005) and the user does so (at 5006). If the user opts (at 5004) to select an existing datum, then the system 100 (at 5007) allows the user to select a datum ID from a list of datums already on the document.

If the user opts (at 5004) for manual entry, the system 100 determines (at 5008) whether the datum ID manually entered (5006) already exists on the document. If the system determines that the manually-entered datum ID does not exist on the document, then the system 100 provides a passive notification (at 5009) that the manually-entered datum ID does not exist on the document and accepts the manually-entered datum ID (at 5010). If the user opts (at 5004) to select an existing datum ID, the system 100 determines (at 5011) whether the datum ID is already present within another datum field of the same FCF row. If the system 100 determines (at 5011) that the selected datum ID is not already present within another datum field of the same FCF row, then the system 100 accepts the selected datum ID. If the system 100 determines (at 5011) that the selected datum ID is already present within another datum field of the same FCF row, the system 100 provides (at 5012) an accept/cancel error message to inform the user of the overuse of the selected datum ID. The system 100 then (at 5013) gives the user the option of accepting or canceling. If the user (at 5013) accepts, then the system accepts the datum ID. Otherwise, if the user (at 5013) cancels the selected datum ID, then the system 100 presents the user with the option of manually entering or selecting an existing datum ID (at 5004) anew.

If the user opts to add a datum group (5002), the system 100 (at 5014) enables the user to add a dash between datum groups, and for each datum group (at 5015) add a common datum position (repeatable), add a dash between common datum positions (at 5017) and, for each common datum position, add a datum (at 5003).

Once one or more datum IDs have been accepted (at 5010), the system enables the user, for each indicator symbol (as a single datum or as an individual datum within a common datum or datum group) (5023), to add an indicator symbol (at 5018), add a material condition (at 5019), and a translation symbol (at 5020), add a state symbol (at 5021), and/or add a statistical symbol (at 5022).

If the user wants to add an indicator symbol (at 5018), the system 100 presents to the user a plurality of user-selectable options including: x, y, z, u, v, w, [CF], [PL], [SL], [PT], "><," [DV], and P (in a circle), and the user (at 5024) makes a selection. If x, y, z, u, v, or w is selected, then the system 100 places all added symbols (as lowercase letters) within a single set of brackets, each separated by a comma. The order of the symbols generally appears is generally the same as their appearance in FIG. 5. If the P (in a circle) option is selected, the system 100 (at 5025) provides the user with a text field for entering a projected offset value and the user does so (at 5026). Alternatively, the user can opt to remove (e.g., deselect) the one of the user-selectable symbols (if previously selected), and/or opt to not select one of the user-selectable symbols.

If the user wants to add a material condition symbol (at 5019), the system 100 presents to the user a plurality of user-selectable options including: M, L, R, and S, each of which is in a circle, and the user (at 5027) makes a selection. Alternatively, the user can opt to remove (e.g., deselect) the one of the user-selectable symbols (if previously selected), and/or opt to not select one of the user-selectable symbols.

If the user wants to add a translation symbol (at 5020), the system 100 presents to the user a user-selectable right-facing arrowhead symbol which the user (at 5028) can select. Alternatively, the user can opt to remove (e.g., deselect) the user-selectable right-facing arrowhead symbol (if previously selected), and/or opt to not select the user-selectable right-facing arrowhead symbol.

If the user wants to add a state symbol (at 5021), the system 100 presents to the user a user-selectable F (in a circle) symbol (not shown in FIG. 6), which the user (at 5029) can select. Alternatively, the user can opt to remove (e.g., deselect) the user-selectable F (in a circle) symbol (if previously selected), and/or opt to not select the user-selectable F (in a circle) symbol.

If the user wants to add a statistical symbol (at 5022), the system 100 presents to the user a user-selectable ST (in a shape) symbol, which the user (at 5030) can select. Alternatively, the user can opt to remove (e.g., deselect) the user-selectable ST (in a shape) symbol (if previously selected), and/or opt to not select the user-selectable ST (in a shape) symbol.

Moreover, for each datum group (5600), if ANSI/ASME applies and/or the system 100 (at 5602) determines that to be the case, the system 100 (at 5601) adds parenthesis to encompass all datums within the datum group.

The logic represented in the exemplary flowcharts of FIGS. 3 and 5 correspond to logic stored as computer-readable instructions/data in a computer-readable medium as a decision control matrix in computer-based memory, which may be part of or otherwise associated with a CAD software program.

Figure 7:
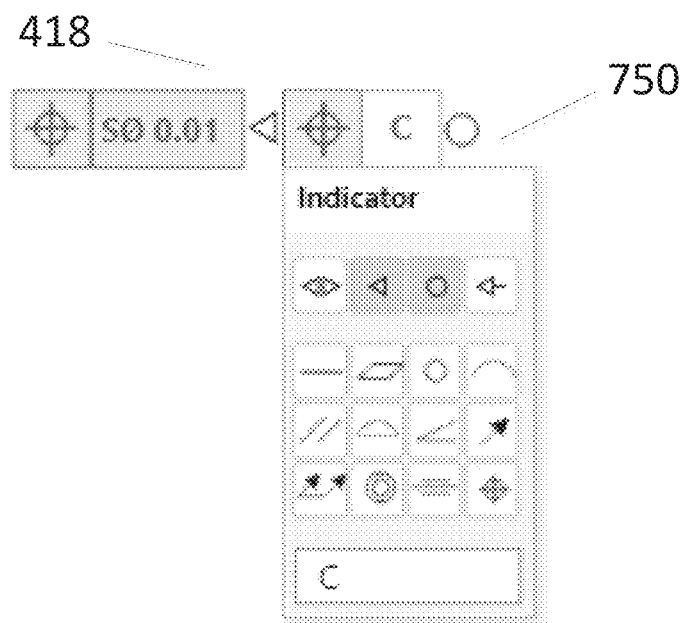
FIG. 7 is a partial example screenshot that might appear on the computer display of FIG. 1 to enable a user to select one or more indicators to be provided with or as part of an FCF.

FIG. 7 is a partial screenshot that shows an example of context menu 750 that the system 100 may display to a user to enable the user to select one or more indicators to be provided with or as an element of an FCF 718. The context menu 750 includes a plurality of user-selectable options (an eye, a backward-facing arrowhead, a circle, and a backward facing arrow with a small tail) that would be available to the user to add to the FCF. The illustrated context menu 750 also has buttons that correspond to a plurality of user-selectable options that relate to tolerance types. According to the illustrated implementation, the circle and the backward-facing arrowhead already have been added to the FCF. According to the illustrated implementation, these would no longer be available to add to the FCF (or the row of the FCF displayed). Therefore, the buttons that correspond to these user-selectable options (the circle and the backward-facing arrowhead) are shown as being visually distinct from the other buttons that are available for selection still. More specifically, in the illustrated implementation, those buttons are visually distinct by virtue of having been darkened. In a typical implementation, the illustrated context menu 750 and/or its associated functionalities can be accessed by the user selecting one or more of the onscreen manipulators.

Figure 8:
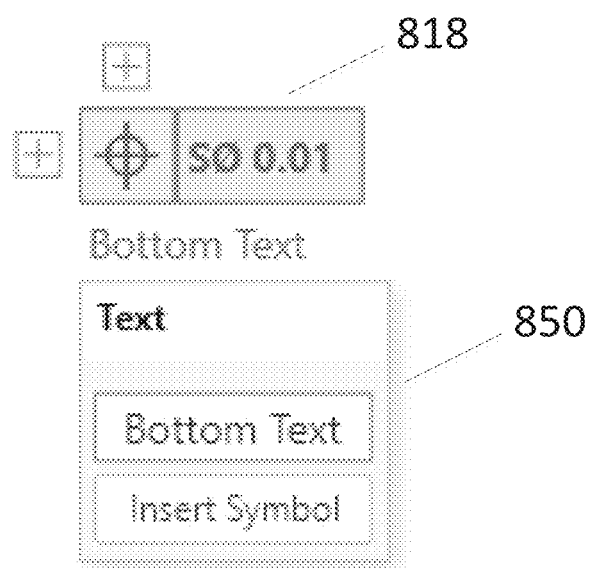
FIG. 8 is a partial example screenshot that might appear on the computer display of FIG. 1 to enable a user to enter text that to be provided with or as part of an FCF.

FIG. 8 is a particular screenshot that shows an example of a context menu 850 that the system 100 may display to a user to enable the user to enter text or symbols with or as an element of an FCF 718. The context menu 850 includes a field for entering the text and two user-selectable options for indicating that the text is bottom text, and to insert a symbol. In a typical implementation, the illustrated context menu 850 and/or its associated functionalities can be accessed by the user selecting one or more of the onscreen manipulators.

Figure 9:
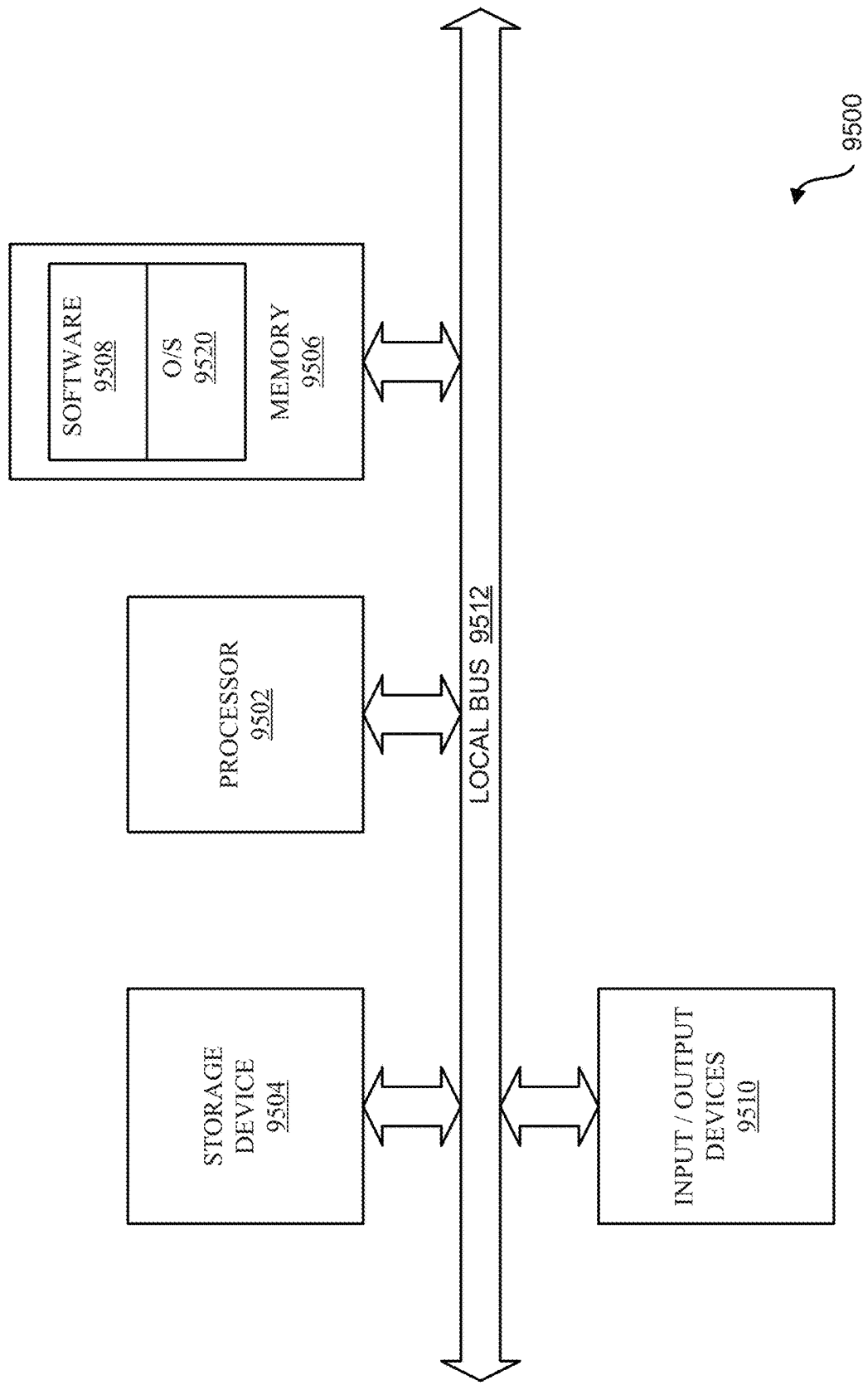
FIG. 9 is a schematic block diagram showing one implementation of the computer system of FIG. 1.

The embodiments for the present system for executing the functionality described in detail above may be implemented via a computer system (e.g., computer system 100 in FIG. 1) which is represented in the schematic diagram of FIG. 9. The system 9500 contains a processor 9502 (that may include a decision control module configured to access the decision control matrix to execute instructions to implement functionalities represented therein), a storage device 9504, a memory 9506 having software 9508 stored therein that defines the abovementioned functionality, input and output (I/O) devices 9510 (or peripherals), and a local bus, or local interface 9512 allowing for communication within the system 9500. The local interface 9512 can be, for example but not limited to, one or more buses or other wired or wireless connections, as is known in the art. The local interface 9512 may have additional elements, which are omitted for simplicity, such as controllers, buffers (caches), drivers, repeaters, and receivers, to enable communications. Further, the local interface 9512 may include address, control, and/or data connections to enable appropriate communications among the aforementioned components.

The processor 9502 is a hardware device for executing software, particularly that stored in the memory 9506. The processor 9502 can be any custom made or commercially available single core or multi-core processor, a central processing unit (CPU), an auxiliary processor among several processors associated with the present system 9500, a semiconductor based microprocessor (in the form of a microchip or chip set), a macroprocessor, or generally any device for executing software instructions.

The memory 9506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 9506 may incorporate electronic, magnetic, optical, and/or other types of storage media. Note that the memory 9506 can have a distributed architecture, where various components are situated remotely from one another, but can be accessed by the processor 9502.

The software 9508 defines functionality performed by the system 9500, in accordance with the present invention. The software 9508 in the memory 9506 may include one or more separate programs, each of which contains an ordered listing of executable instructions for implementing logical functions of the system 9500, as described below. The memory 9506 may contain an operating system (O/S) 9520. The operating system essentially controls the execution of programs within the system 9500 and provides scheduling, input-output control, file and data management, memory management, and communication control and related services.

The I/O devices 9510 may include input devices, for example but not limited to, a keyboard, mouse, scanner, microphone, touch and stylus, etc. Furthermore, the I/O devices 9510 may also include output devices, for example but not limited to, a printer, display, etc. Finally, the I/O devices 9510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 9500 is in operation, the processor 9502 is configured to execute the software 9508 stored within the memory 9506, to communicate data to and from the memory 9506, and to generally control operations of the system 9500 pursuant to the software 9508, as explained above.

When the functionality of the system 9500 is in operation, the processor 9502 is configured to execute the software 9508 stored within the memory 9506, to communicate data to and from the memory 9506, and to generally control operations of the system 9500 pursuant to the software 9508.

The operating system 9520 is read by the processor 9502, perhaps buffered within the processor 9502, and then executed.

When the system 9500 is implemented in software 9508, it should be noted that instructions for implementing the system 9500 can be stored on any computer-readable medium for use by or in connection with any computer-related device, system, or method. Such a computer-readable medium may, in some embodiments, correspond to either or both the memory 9506 and the storage device 9504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 9502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 9500 is implemented more so in hardware, the system 9500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A number of embodiments of the invention have been described. Nevertheless, it will be understood that various modifications may be made without departing from the spirit and scope of the invention.

For example, terminology, abbreviations, and symbols disclosed herein come from certain industry standards, mentioned above. However, different terminology, abbreviations, and symbols may be substituted for those disclosed explicitly herein.

Various aspects of the interface design, and its visual appearance, can vary considerably. For example, the relative positioning of the various visual elements can vary. Likewise, the size and shape of the buttons and other graphical element that represent the user-selectable options, fields, etc. can vary. Certain features from different screenshots may, in some implementations, be combined into one, whereas certain features shown as being on the same screenshot, may be separated. Certain functionalities, user options, text fields for data entry, etc. may be omitted entirely. Certain functionalities, user options, text fields for data entry, etc. may be added.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, this should not be understood as requiring that such operations be performed in the particular order shown or in sequential order, or that all represented operations be performed, to achieve desirable results.

Other implementations are within the scope of the claims.

What is claimed is:

1. A computer-based method of creating and/or editing a visual appearance of a feature control frame (FCF) on a computer screen, wherein the FCF indicates geometric dimensioning & tolerancing (GD&T) of a model in a computer-aided design (CAD) program, the method comprising:
   displaying on a computer screen, in a graphics area of the CAD program, a first cell of a FCF for a geometric feature of the model, wherein the first cell of the FCF does not contain any visual symbol or other data associated with the GD&T;
   displaying on the computer screen a first context menu adjacent to the first cell of the FCF, wherein the first context menu comprises a first plurality of user-selectable input options associated with GD&T information for the geometric feature in the first cell;
   receiving, through a computer input device, a user selection of one of the first plurality of user-selectable input options;
   populating the first cell of the FCF on the computer screen with a first cell entry that corresponds to the user selection;
   displaying on the computer screen a second cell of the FCF adjacent to the first cell of the FCF; and
   displaying second context menu adjacent to the second cell of the FCF, wherein the second context menu comprises a second plurality of user-selectable input options associated with GD&T information for the geometric feature,
   wherein the options included in the second plurality of user-selectable input options depend, at least in part, on which of the first plurality of user-selectable input options the user selected.

2. The computer-based method of claim 1, wherein the first plurality of user-selectable input options and the second plurality of user-selectable input options relate to a common feature characteristic, and
   wherein the common feature characteristic is selected from the group consisting of: primary range, complex range, combination, offset, constraint, filter type, filter index, associated feature, derived feature, associated characteristic, parametric characteristic, material condition, translation symbol, and state symbol.

3. The computer-based method of claim 1, wherein the first plurality of user-selectable input options and the second plurality of user-selectable input options relate to different feature characteristics, and
   wherein each of the different feature characteristics is selected from the group consisting of: primary range, complex range, combination, offset, constraint, filter type, filter index, associated feature, derived feature, associated characteristic, parametric characteristic, material condition, translation symbol, and state symbol.

4. The computer-based method of claim 1, further comprising:
   displaying the first cell of the FCF in a sequence of cells displayed in the graphics area of the CAD program to form the FCF; and
   displaying an associated one of a plurality of different context menus adjacent each respective one of the cells when that cell is active.

5. The computer-based method of claim 4, wherein each respective one of the plurality of different context menus has a plurality of user-selectable options.

6. The computer-based method of claim 5, further comprising:
   receiving a first selection by a user of one of the plurality of user-selectable options; and
   modifying a user's ability to select one or more of the other user-selectable options based on the first selection by the user.

7. The computer-based method of claim 5, further comprising:
   receiving a first selection by a user of one of the plurality of user-selectable options; and
   modifying accessibility to one or more text entry fields in the associated context menu based on the first selection by the user.

8. The computer-based method of claim 5, wherein the user-selectable options available in each respective one of the plurality of context menus is based, at least in part, on one or more industry standards for GD&T.

9. The computer-based method of claim 1, wherein the first cell of the FCF is an initial cell of the FCF,
   wherein the first context menu is a context menu for the initial cell of the FCF, and
   wherein the context menu for the initial cell of the FCF comprises a plurality of user-selectable options, each of which has a graphical symbols that correspond to one of a plurality of different tolerance types.

10. The computer-based method of claim 9,
    wherein the second cell of the FCF immediately follows the initial cell of the FCF; and
    wherein the context menu for the cell immediately following the initial cell of the FCF comprises a plurality of user-selectable options, each of which has a graphical symbols that correspond to one of a plurality of different tolerance shapes.

11. The computer-based method of claim 10, further comprising:
displaying a random access context menu associated with the FCF, wherein the random access context menu comprises a plurality of user-selectable options that correspond to different feature characteristics, wherein selecting a particular one of the user-selectable options in the random access context menu enables the user to access a context menu associated with the feature characteristic associated with the selected option.

12. The computer-based method of claim 1, further comprising:
enabling a user to enter text and/or symbols for display in or near the FCF in the graphics area of the CAD program.

13. The computer-based method of claim 1, further comprising:
displaying a context menu in the graphics area of the CAD program adjacent the FCF with a plurality of user-selectable options, each of which corresponds to one of a plurality of indicators,
wherein the system is configured to add a corresponding indicator to a row of the FCF in response to a user's selection of one of the user-selectable options.

14. The computer-based method of claim 1, further comprising:
receiving an indication that a user has created or selected a feature of the model;
displaying at least part of the FCF for the selected feature in response to the indication.

15. The computer-based method of claim 1, further comprising:
displaying one or more user-selectable manipulators in association with the first cell of the FCF; and
adding a new cell to the FCF in response to a user selecting one of the user-selectable manipulators.

16. The computer-based method of claim 1, further comprising:
storing in computer-based memory a decision control matrix that maps one or more option presented for selection to a user to one or more prior inputs from the user; and
a decision control module implemented in a computer-based processor configured to access the decision control matrix and to determine, based on the decision control matrix which of a plurality of options should be presented to the user based on one or more of the user's prior inputs.

17. The computer-based method of claim 16, further comprising:
presenting to the user, a context menu that includes the plurality of options that the decision control module determined should be presented to the user for selection.

18. A computer-based system comprising:
a computer-based processor; and
computer-readable memory storing computer-readable instructions for a computer-aided design (CAD) program that, when executed by the computer-based processor, causes the computer-system to run the CAD program and facilitate creating and/or editing a visual appearance of a feature control frame (FCF) on a computer screen, wherein the FCF indicates geometric dimensioning & tolerancing (GD&T) of a model in the CAD program by:
displaying on the computer screen, in a graphics area of the CAD program, a first cell of a FCF for a geometric feature of the model, wherein the first cell of the FCF does not contain any visual symbol or other data associated with the GD&T;
displaying on the computer screen a first context menu adjacent to the first cell of the FCF, wherein the first context menu comprises a first plurality of user-selectable input options associated with GD&T information for the geometric feature in the first cell;
receiving, through a computer input device, a user selection of one of the first plurality of user-selectable input options;
populating the first cell of the FCF on the computer screen with a first cell entry that corresponds to the user selection;
displaying on the computer screen a second cell of the FCF adjacent to the first cell of the FCF; and
displaying second context menu adjacent to the second cell of the FCF, wherein the second context menu comprises a second plurality of user-selectable input options associated with GD&T information for the geometric feature,
wherein the options included in the second plurality of user-selectable input options depend, at least in part, on which of the first plurality of user-selectable input options the user selected.

19. The computer-based system of claim 18, further comprising:
displaying the first cell of the FCF in a sequence of cells displayed in the graphics area of the CAD program to form the FCF; and
displaying an associated one of a plurality of different context menus adjacent each respective one of the cells when that cell is active,
wherein each respective one of the plurality of different context menus has a plurality of user-selectable options.

20. The computer-based system of claim 19, wherein the user-selectable options available in each respective one of the plurality of context menus is based, at least in part, on one or more industry standards for GD&T.

21. The computer-based system of claim 18,
wherein the first cell of the FCF is an initial cell of the FCF,
wherein the first context menu is for the initial cell of the FCF and comprises a plurality of user-selectable options, each of which has a graphical symbols that correspond to one of a plurality of different tolerance types;
wherein the second cell of the FCF immediately follows the initial cell of the FCF; and
wherein the context menu for the cell immediately following the initial cell of the FCF comprises a plurality of user-selectable options, each of which has a graphical symbols that correspond to one of a plurality of different tolerance shapes.

22. The computer-based system of claim 18, further comprising:
displaying a random access context menu associated with the FCF, wherein the random access context menu comprises a plurality of user-selectable options that correspond to different feature characteristics, wherein selecting a particular one of the user-selectable options in the random access context menu enables the user to access a context menu associated with the feature characteristic associated with the selected option.

23. The computer-based system of claim 18, further comprising:
enabling a user to add text, symbols, indicators, or new cells for display in or near the FCF in the graphics area of the CAD program.

24. The computer-based system of claim 18, further comprising:
storing in the computer-based memory a decision control matrix that maps one or more option presented for selection to a user to one or more prior inputs from the user; and
implementing a decision control module in the computer-based processor, wherein the decision control module is configured to access the decision control matrix and to determine, based on the decision control matrix which of a plurality of options should be presented to the user based on one or more of the user's prior inputs.

* * * * *